US012569758B2

(12) United States Patent
Li

(10) Patent No.: US 12,569,758 B2
(45) Date of Patent: Mar. 10, 2026

(54) METHOD AND APPARATUS FOR CONTROLLING VIRTUAL CHARACTER TO CAST SKILL, DEVICE, MEDIUM, AND PROGRAM PRODUCT

(71) Applicant: Tencent Technology (Shenzhen) Company Limited, Shenzhen (CN)

(72) Inventor: Renjie Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 649 days.

(21) Appl. No.: 17/840,486

(22) Filed: Jun. 14, 2022

(65) Prior Publication Data

US 2023/0040506 A1 Feb. 9, 2023

Related U.S. Application Data

(63) Continuation of application No. PCT/CN2021/125019, filed on Oct. 20, 2021.

(30) Foreign Application Priority Data

Aug. 3, 2021 (CN) .......................... 202110888291.2

(51) Int. Cl.
*A63F 13/426* (2014.01)
*A63F 13/2145* (2014.01)
(Continued)

(52) U.S. Cl.
CPC ........ *A63F 13/426* (2014.09); *A63F 13/2145* (2014.09); *A63F 13/45* (2014.09);
(Continued)

(58) Field of Classification Search
CPC .... A63F 13/2145; A63F 13/426; A63F 13/45;
A63F 13/52; A63F 13/53; A63F 13/537;
(Continued)

(56) References Cited

U.S. PATENT DOCUMENTS 6,409,604 B1 * 6/2002 Matsuno ............... A63F 13/833
463/31
9,808,720 B2 * 11/2017 Taylor ................... A63F 13/822
(Continued)

FOREIGN PATENT DOCUMENTS

CN 105148517 A 12/2015
CN 107596688 A 1/2018
(Continued)

OTHER PUBLICATIONS

Tencent Technology, Japanese Office Action, JP 2022-563112, Oct. 24, 2023, 10 pgs.
(Continued)

*Primary Examiner* — Illiam H Mcculloch, Jr.
(74) *Attorney, Agent, or Firm* — Morgan, Lewis & Bockius LLP

(57) ABSTRACT

A method for controlling a virtual character to cast a skill includes: displaying a first virtual character and a skill control configured to cast a ranged skill; in response to detecting a trigger operation on the skill control: displaying a ranged skill indicator to indicate a casting range of the ranged skill based on a user control, the casting range having a first boundary point based on a location of the first virtual character and a second boundary point based on a location of the drag control. The method changes at least one of a shape and an area of the casting range in response to a drag operation on the drag control. The method allows a user to efficiently attack enemy virtual characters in accordance with a determination that locations of the enemy virtual characters are scattered, improving a processing efficiency of an electronic device.

20 Claims, 14 Drawing Sheets

(51) Int. Cl.

| | |
|---|---|
| *A63F 13/45* | (2014.01) |
| *A63F 13/52* | (2014.01) |
| *A63F 13/53* | (2014.01) |
| *A63F 13/537* | (2014.01) |
| *A63F 13/55* | (2014.01) |
| *A63F 13/58* | (2014.01) |
| *A63F 13/80* | (2014.01) |
| *A63F 13/822* | (2014.01) |
| *A63F 13/92* | (2014.01) |

(52) U.S. Cl.
CPC .............. *A63F 13/52* (2014.09); *A63F 13/53* (2014.09); *A63F 13/537* (2014.09); *A63F 13/55* (2014.09); *A63F 13/58* (2014.09); *A63F 13/80* (2014.09); *A63F 13/822* (2014.09); *A63F 13/92* (2014.09); *A63F 2300/80* (2013.01)

(58) Field of Classification Search
CPC .......... A63F 13/55; A63F 13/58; A63F 13/80; A63F 13/822; A63F 13/92; A63F 2300/80
See application file for complete search history.

(56) References Cited

U.S. PATENT DOCUMENTS

| | | | | |
|---|---|---|---|---|
| 9,901,821 | B2 * | 2/2018 | Matsui | .................... A63F 13/45 |
| 10,183,222 | B2 * | 1/2019 | Tsui | ...................... A63F 13/837 |
| 10,456,667 | B2 * | 10/2019 | Tang | .................... A63F 13/822 |
| 10,507,383 | B2 * | 12/2019 | He | ........................ G06F 3/0488 |
| 10,702,774 | B2 * | 7/2020 | Wang | ................. G06F 3/04845 |
| 10,702,775 | B2 * | 7/2020 | Rong | .................. G06F 3/0481 |
| 10,716,997 | B2 * | 7/2020 | He | ...................... G06F 3/04883 |
| 11,383,165 | B2 * | 7/2022 | Shao | .................... A63F 13/533 |
| 11,890,541 | B2 * | 2/2024 | Hu | ........................ A63F 13/426 |
| 11,890,542 | B2 * | 2/2024 | Wan | ....................... A63F 13/56 |
| 11,893,217 | B2 * | 2/2024 | Wan | ................... G06F 3/04815 |
| 12,102,916 | B2 * | 10/2024 | Hu | ..................... A63F 13/2145 |
| 12,179,091 | B2 * | 12/2024 | Anderson | ............... A63F 13/52 |
| 12,303,781 | B2 * | 5/2025 | Wei | ...................... G06F 3/0486 |
| 2012/0252577 | A1 * | 10/2012 | Webster | ................. A63F 13/95 463/31 |
| 2013/0217498 | A1 * | 8/2013 | Wang | ................. A63F 13/2145 463/37 |
| 2014/0364214 | A1 * | 12/2014 | Ayoub | .................... A63F 13/45 463/31 |
| 2015/0231491 | A1 * | 8/2015 | Hwang | .................. G06F 3/041 345/161 |
| 2015/0265927 | A1 * | 9/2015 | Taylor | .................... A63F 13/69 463/9 |
| 2017/0282076 | A1 * | 10/2017 | Tsui | ........................ A63F 13/35 |
| 2017/0340959 | A1 * | 11/2017 | Tang | .................... G06F 3/0488 |
| 2018/0121086 | A1 | 5/2018 | Wang | |
| 2018/0339229 | A1 * | 11/2018 | He | ...................... G06F 3/04847 |
| 2018/0369693 | A1 * | 12/2018 | Rong | .................... A63F 13/92 |
| 2019/0070494 | A1 * | 3/2019 | He | .......................... H04M 1/00 |
| 2019/0070496 | A1 * | 3/2019 | He | .......................... A63F 13/92 |
| 2019/0091570 | A1 * | 3/2019 | Wang | .................... A63F 13/42 |
| 2019/0308105 | A1 | 10/2019 | Lai et al. | |
| 2021/0260479 | A1 * | 8/2021 | Yang | .................. A63F 13/2145 |
| 2021/0339138 | A1 * | 11/2021 | Shao | .................. A63F 13/2145 |
| 2022/0035515 | A1 * | 2/2022 | Wan | .................. A63F 13/5372 |
| 2022/0047946 | A1 * | 2/2022 | Hu | ........................ A63F 13/822 |
| 2022/0152509 | A1 * | 5/2022 | Zhang | .................. A63F 13/577 |
| 2023/0040506 | A1 * | 2/2023 | Li | ............................ A63F 13/80 |
| 2024/0033629 | A1 * | 2/2024 | Zheng | .................. A63F 13/533 |
| 2024/0261686 | A1 * | 8/2024 | Hu | .......................... A63F 13/56 |
| 2024/0350918 | A1 * | 10/2024 | Li | ........................... A63F 13/56 |

FOREIGN PATENT DOCUMENTS

| | | | |
|---|---|---|---|
| CN | 109107153 A | 1/2019 | |
| CN | 109117050 A | 1/2019 | |
| CN | 110694261 A | 1/2020 | |
| CN | 111589140 A | 8/2020 | |
| CN | 111659107 A | 9/2020 | |
| CN | 111672103 A | 9/2020 | |
| CN | 111760274 A | 10/2020 | |
| CN | 112402949 A | 2/2021 | |
| JP | 2016525909 A | 9/2016 | |
| JP | 2018514041 A | 5/2018 | |
| TW | 201250577 A | 12/2012 | |
| WO | WO 2023/010690 A1 | 2/2023 | |

OTHER PUBLICATIONS

Tencent Technology, Extended European Search Report, EP 21935453, Sep. 27, 2023, 9 pgs.

Tencent Technology, ISR, PCT/CN2021/125019, Apr. 29, 2022, 2 pgs.

Tencent Technology, WO, PCT/CN2021/125019, Apr. 29, 2022, 3 pgs.

Tencent Technology, IPRP, PCT/CN2021/125019, Feb. 6, 2024, 4 pgs.

Tencent Technology, Philippines Office Action, PH Patent Application No. 1/2022/551474, May 21, 2025, 6 pgs.

Tencent Technology, Korean Office Action, KR Patent Application No. 1020227031710, Jul. 5, 2024, 9 pgs.

* cited by examiner

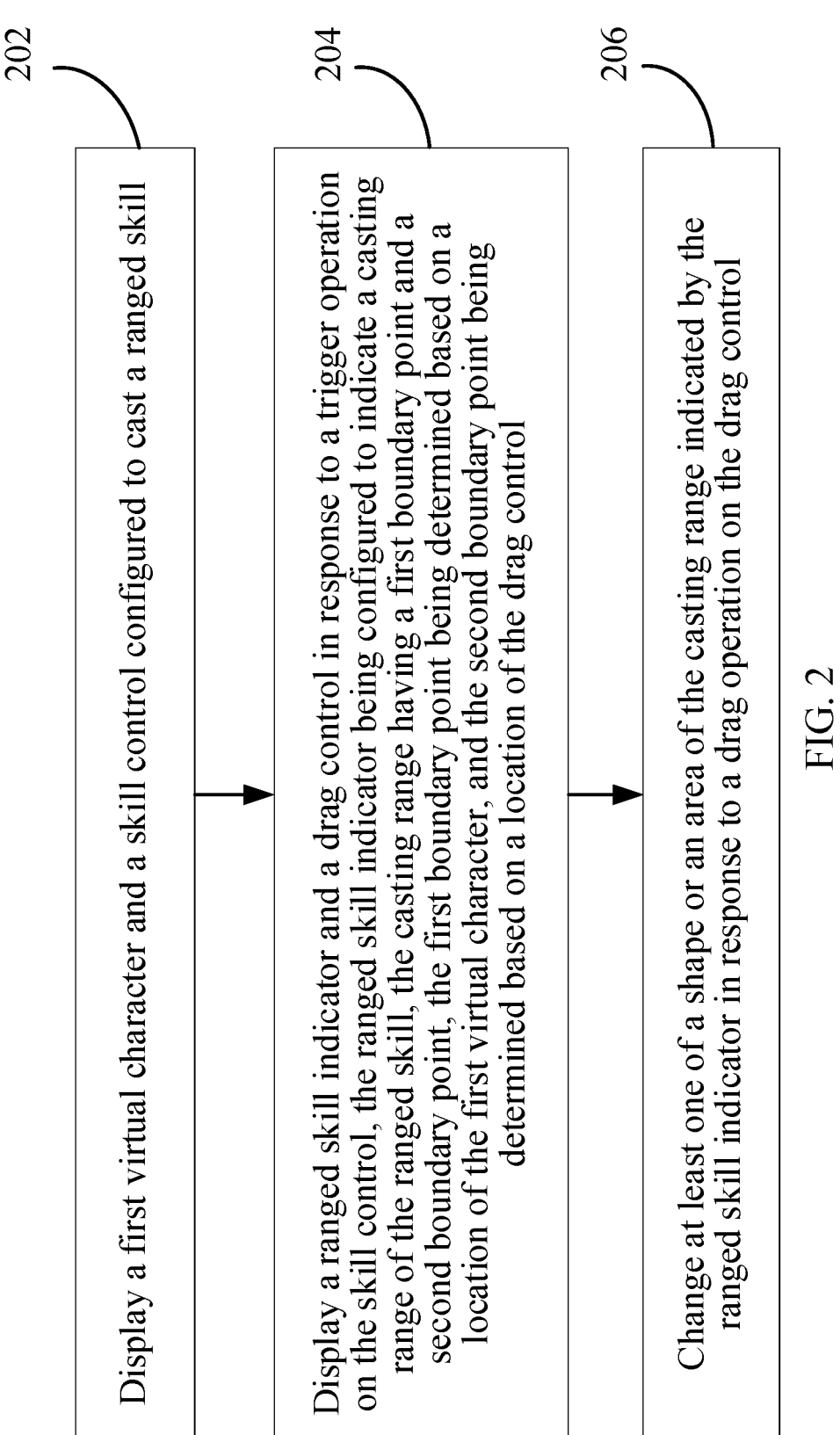

202

Display a first virtual character and a skill control configured to cast a ranged skill

204

Display a ranged skill indicator and a drag control in response to a trigger operation on the skill control, the ranged skill indicator being configured to indicate a casting range of the ranged skill, the casting range having a first boundary point and a second boundary point, the first boundary point being determined based on a location of the first virtual character, and the second boundary point being determined based on a location of the drag control

206

Change at least one of a shape or an area of the casting range indicated by the ranged skill indicator in response to a drag operation on the drag control

FIG. 2

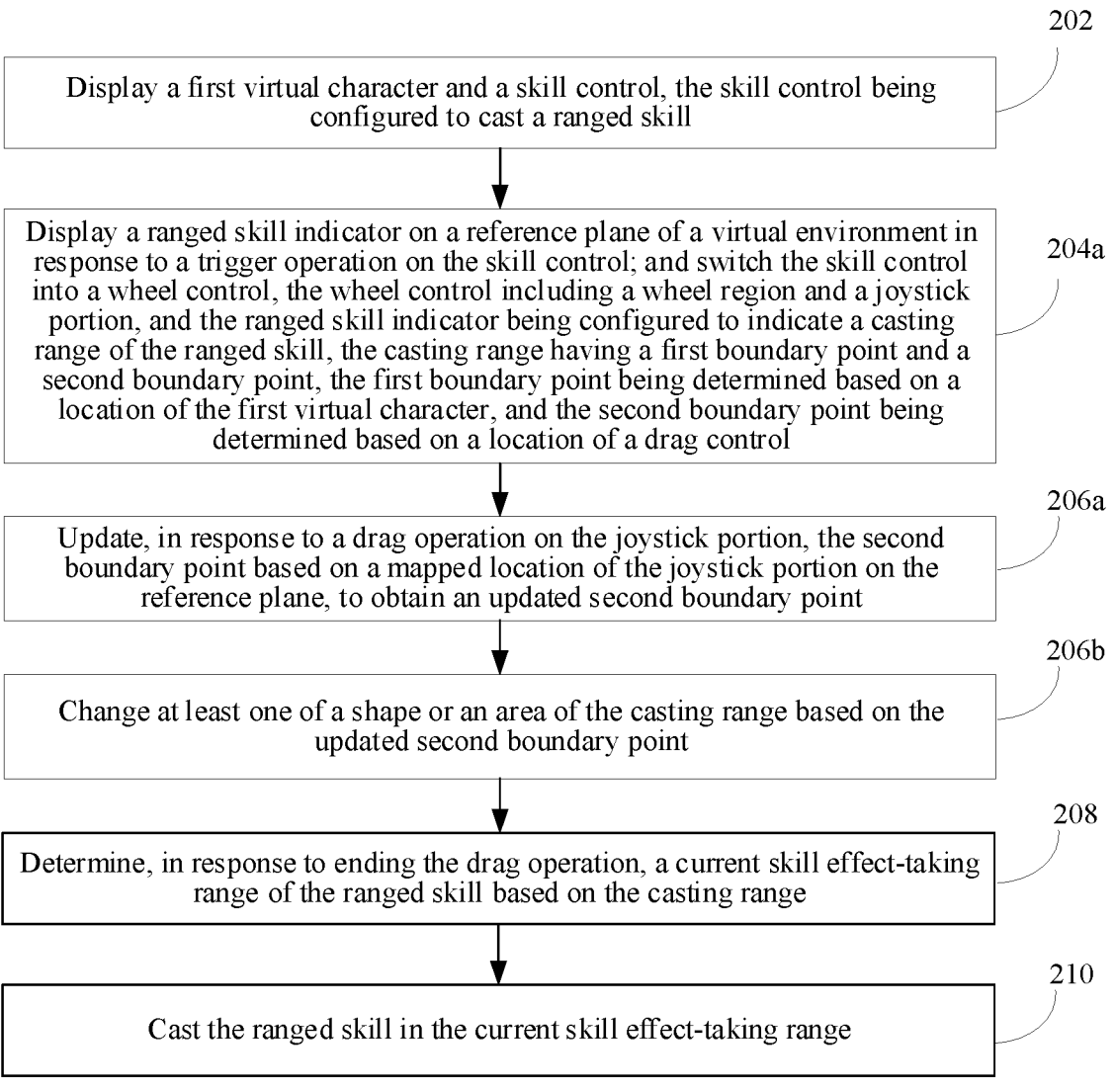

202

Display a first virtual character and a skill control, the skill control being configured to cast a ranged skill 204a Display a ranged skill indicator on a reference plane of a virtual environment in response to a trigger operation on the skill control; and switch the skill control into a wheel control, the wheel control including a wheel region and a joystick portion, and the ranged skill indicator being configured to indicate a casting range of the ranged skill, the casting range having a first boundary point and a second boundary point, the first boundary point being determined based on a location of the first virtual character, and the second boundary point being determined based on a location of a drag control 206a Update, in response to a drag operation on the joystick portion, the second boundary point based on a mapped location of the joystick portion on the reference plane, to obtain an updated second boundary point 206b Change at least one of a shape or an area of the casting range based on the updated second boundary point

208

Determine, in response to ending the drag operation, a current skill effect-taking range of the ranged skill based on the casting range

210

Cast the ranged skill in the current skill effect-taking range

FIG. 6

Plurality of candidate skill effect-taking ranges

Casting range
indicated by ranged
skill indicator   (4, 4)

Current skill effect-taking range

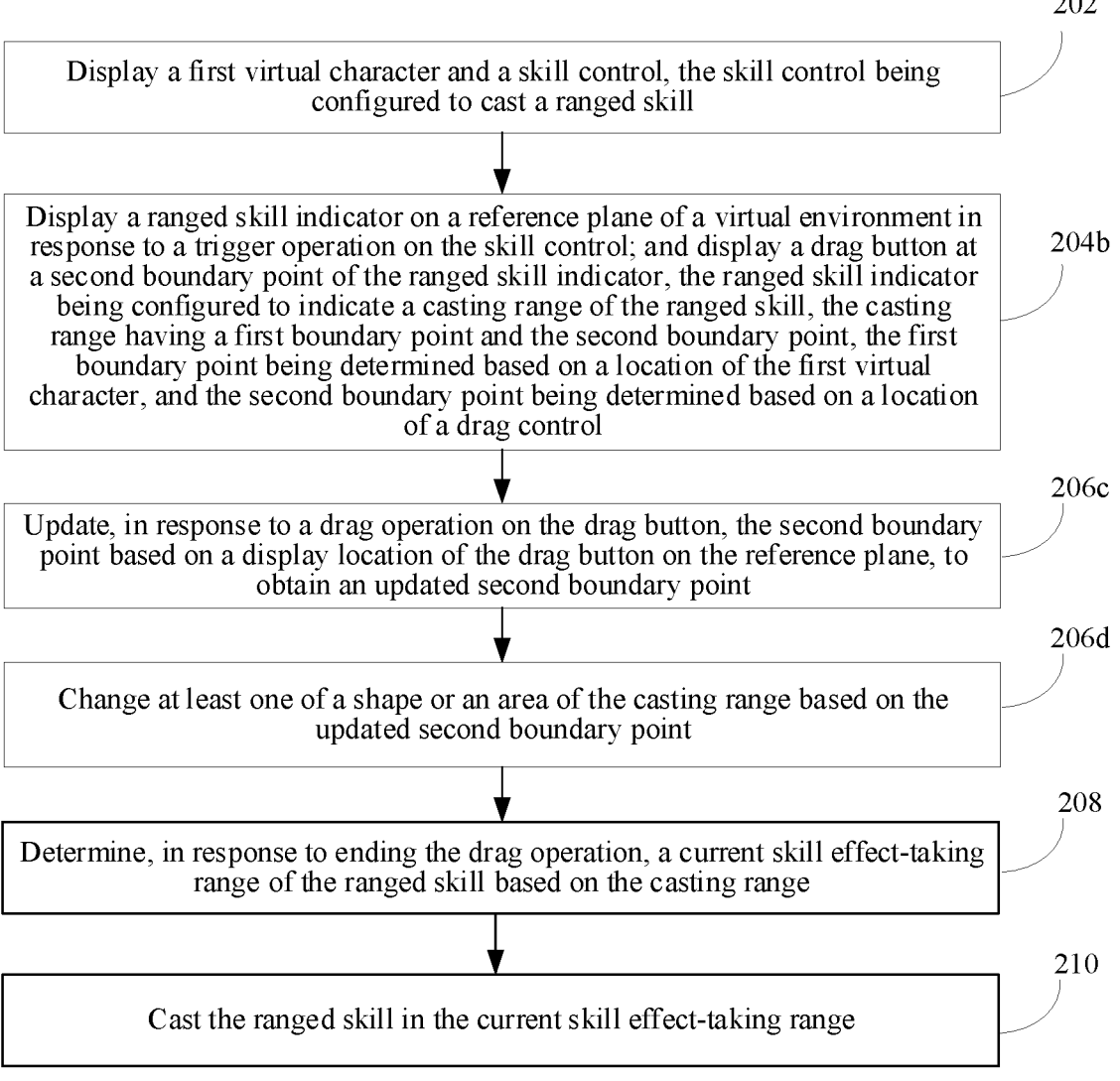

202

Display a first virtual character and a skill control, the skill control being configured to cast a ranged skill 204b Display a ranged skill indicator on a reference plane of a virtual environment in response to a trigger operation on the skill control; and display a drag button at a second boundary point of the ranged skill indicator, the ranged skill indicator being configured to indicate a casting range of the ranged skill, the casting range having a first boundary point and the second boundary point, the first boundary point being determined based on a location of the first virtual character, and the second boundary point being determined based on a location of a drag control 206c Update, in response to a drag operation on the drag button, the second boundary point based on a display location of the drag button on the reference plane, to obtain an updated second boundary point 206d Change at least one of a shape or an area of the casting range based on the updated second boundary point

208

Determine, in response to ending the drag operation, a current skill effect-taking range of the ranged skill based on the casting range

210

Cast the ranged skill in the current skill effect-taking range

FIG. 10

METHOD AND APPARATUS FOR CONTROLLING VIRTUAL CHARACTER TO CAST SKILL, DEVICE, MEDIUM, AND PROGRAM PRODUCT

CROSS-REFERENCE TO RELATED APPLICATIONS

This application is a continuation application of PCT Patent Application No. PCT/CN2021/125019, entitled "Virtual objects release skills of methods, devices, devices, media and program products" filed on Oct. 20, 2021, which claims priority to Chinese Patent Application No. 202110888291.2, filed with the State Intellectual Property Office of the People's Republic of China on Aug. 3, 2021, and entitled "METHOD AND APPARATUS FOR CONTROLLING VIRTUAL CHARACTER TO CAST SKILL, DEVICE, MEDIUM, AND PROGRAM PRODUCT", all of which are incorporated herein by reference in their entirety.

FIELD OF THE TECHNOLOGY

This application relates to the field supporting human-machine interaction, and in particular, to a method and apparatus for controlling a virtual object to cast a skill, a device, a medium, and a program product.

BACKGROUND OF THE DISCLOSURE

A battle game is a game in which a plurality of user accounts compete in the same scene. In some embodiments, the battle game may be a multiplayer online battle arena (MOBA) game.

In a typical MOBA game, a player may control a virtual character to cast a ranged skill to attack at least one enemy virtual character in a specified range. A client displays a virtual character in a virtual environment and a skill button. After a user clicks/taps the skill button, the client displays a ranged skill indicator on the ground in the virtual environment. The ranged skill indicator is configured to indicate a casting range of a ranged skill. The user may control a direction, a location, and a distance of the casting range by dragging the skill button.

In accordance with a determination that a quantity of enemy virtual characters is not fixed, and locations thereof are scattered, because a casting range is fixed, a terminal needs to receive a plurality of operations for selecting a casting range, to cast skills to a plurality of enemy virtual characters at scattered locations, resulting in low processing efficiency of the terminal in attacking the enemy virtual characters.

SUMMARY

This application provides a method and apparatus for controlling a virtual object to cast a skill, a device, a medium, and a program product, to efficiently attack enemy virtual characters casting a ranged skill in accordance with a determination that locations of the enemy virtual characters are scattered, thereby improving the processing efficiency of a terminal. The technical solutions are follows:

According to an aspect of this application, a method for controlling a virtual character to cast a skill is provided at an electronic device, the method including:

displaying a first virtual character and a skill control configured to cast a ranged skill;

in response to detecting a trigger operation on the skill control: displaying a ranged skill indicator, wherein the ranged skill indicator is configured to indicate a casting range of the ranged skill based on a user control, the casting range having a first boundary point and a second boundary point, the first boundary point is determined based on a location of the first virtual character, and the second boundary point is determined based on a location of the drag control; and in response to a drag operation on the drag control: changing at least one of a shape or an area of the casting range.

According to another aspect of this application, an apparatus for controlling a virtual character to cast a skill, including:

a display module, configured to display a first virtual character and a skill control, the skill control being configured to cast a ranged skill;

an interaction module, configured to display a ranged skill indicator and a drag control in response to a trigger operation on the skill control, the ranged skill indicator being configured to indicate a casting range of the ranged skill, the casting range having a first boundary point and a second boundary point, the first boundary point being determined based on a location of the first virtual character, and the second boundary point being determined based on a location of the drag control; and a changing module, configured to change at least one of a shape or an area of the casting range in response to a drag operation on the drag control.

According to another aspect of this application, a computer device is provided, including a processor and a memory, the memory storing at least one instruction, at least one program, a code set, or an instruction set, the at least one instruction, the at least one program, the code set, or the instruction set being loaded and executed by the processor to implement the method for controlling a virtual character to cast a skill according to the foregoing aspect.

According to another aspect of this application, a computer-readable storage medium is provided, storing at least one instruction, at least one program, a code set, or an instruction set, the at least one instruction, the at least one program, the code set, or the instruction set being loaded and executed by a processor to implement the method for controlling a virtual character to cast a skill according to the foregoing aspect.

According to an aspect of the embodiments of the present disclosure, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, causing the computer device to implement the method for controlling a virtual character to cast a skill provided in the foregoing optional implementations.

The technical solutions provided in the embodiments of this application include at least the following beneficial effects:

A user control can include a drag control. A drag operation on a drag control is received, two boundary points of a casting range are determined respectively based on a location of a first virtual character and a location of the drag control, and further, a shape and/or an area of the casting range are/is changed in response to the drag operation. The area and/or the shape of the casting range bounded by a ranged skill indicator can be changed by receiving only one operation. Therefore, a manner of casting a ranged skill with a customized casting range is provided, to simplify processing steps of a terminal in attacking a plurality of enemy virtual characters at scattered locations, thereby improving the processing efficiency of the terminal.

BRIEF DESCRIPTION OF THE DRAWINGS

FIG. 2 is a flowchart of a method for controlling a virtual character to cast a skill according to an exemplary embodiment of this application.

FIG. 6 is a flowchart of a method for controlling a virtual character to cast a skill according to an exemplary embodiment of this application.

FIG. 10 is a flowchart of a method for controlling a virtual character to cast a skill according to an exemplary embodiment of this application.

DESCRIPTION OF EMBODIMENTS

Figure 1:
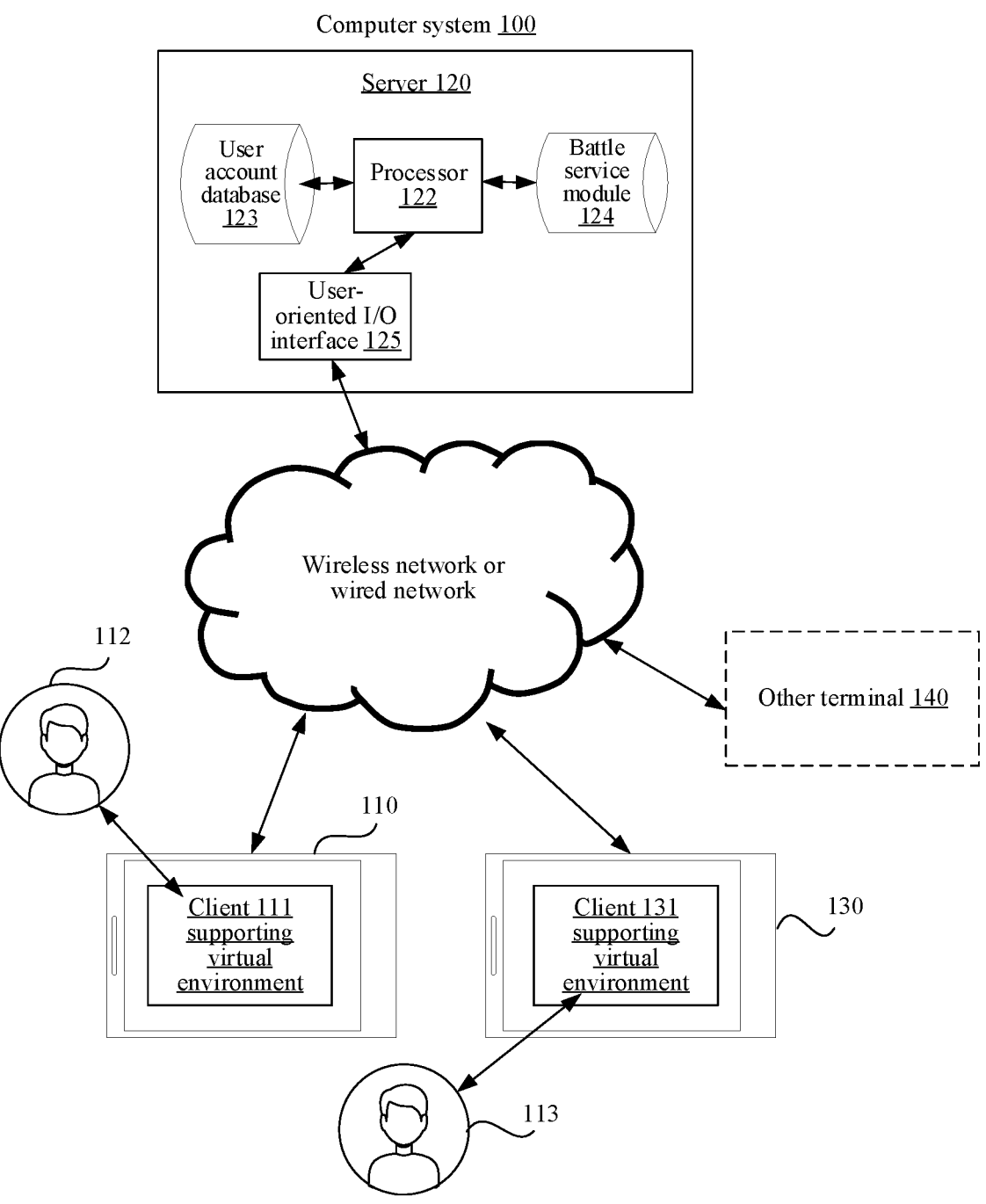
FIG. 1 is a block diagram of a computer system according to an exemplary embodiment of this application.

To make the objectives, technical solutions, and advantages of this application clearer, the following further describes implementations of this application in detail with reference to the accompanying drawings.

First, terms involved in the embodiments of this application are introduced:

Virtual environment: A virtual environment is a virtual environment displayed (or provided) by an application program when run on a terminal. The virtual environment may be a simulated world of a real world, or may be a semi-simulated semi-fictional three-dimensional world, or may be an entirely fictional three-dimensional world. The virtual environment may be any one of a two-dimensional virtual environment, a 2.5-dimensional virtual environment, or a three-dimensional virtual environment. In some embodiments, the virtual environment is further used for a virtual environment battle between at least two virtual characters, and there are virtual resources available to the at least two virtual characters in the virtual environment. In some embodiments, the virtual environment includes a lower left corner region and an upper right corner region that are symmetrical. Virtual characters belonging to two opposing camps occupy the regions respectively, and the objective of each side is to destroy a target building/fort/base/crystal deep in the opponent's region to win victory.

Virtual object: A virtual object is a movable object in a virtual environment. The movable object may be at least one of a virtual character, a virtual animal, or an animation or cartoon figure. In some embodiments, when the virtual environment is a three-dimensional virtual environment, the virtual character may be a three-dimensional model. Each virtual character has a shape and a volume in the three-dimensional virtual environment, and occupies some space in the three-dimensional virtual environment. In some embodiments, the virtual character is a three-dimensional character constructed based on three-dimensional human skeleton technology. The virtual character wears different skins to implement different appearances. In some implementations, the virtual character may be alternatively implemented by using a 2.5-dimensional model or a two-dimensional model. This is not limited in the embodiments of this application.

MOBA: MOBA is an arena in which different virtual teams on at least two opposing camps occupy respective map regions in a virtual environment, and compete against each other using specific victory conditions as goals. The victory condition includes, but is not limited to, at least one of occupying a fort or destroying a fort of the opposing side, killing virtual characters on the opposing side, ensuring own survival in a specified scene and time, seizing a specific resource, or outscoring the opponent within a specified time. The battle arena game may take place in rounds. The same map or different maps may be used in different rounds of the battle arena game. Each virtual team includes one or more virtual characters, for example, 1 virtual character, 2 virtual characters, 3 virtual characters, or 5 virtual characters.

A MOBA game is a game in which several forts are provided in a virtual environment, and users on different camps control virtual characters to battle in the virtual environment to occupy forts or destroy forts of the opposing camp. For example, in the MOBA game, the users may be divided into two opposing camps. The virtual characters controlled by the users are scattered in the virtual environment to compete against each other, and the victory condition is to destroy or occupy all opponent forts. The MOBA game takes place in rounds. A duration of one round of the MOBA game is from a moment at which the game starts to a movement at which the victory condition is met.

User interface (UI) control: A user interface control is any visual control or element that can be seen on a user interface of an application program, for example, a control such as a picture, an input box, a text box, a button, or a label. Some user interface controls respond to an operation of a user. For example, a skill control controls a master virtual character to cast a skill. The user triggers the skill control to control the master virtual character to cast the skill. UI controls involved in the embodiments of this application include, but are not limited to: skill controls and movement controls.

FIG. 1 is a structural block diagram of a computer system according to an exemplary embodiment of this application.

The computer system 100 includes a first terminal 110, a server 120, and a second terminal 130.

A client 111 supporting a virtual environment is installed and run on the first terminal 110, and the client 111 may be a multiplayer online battle program. When the first terminal runs the client 111, a UI of the client 111 is displayed on a screen of the first terminal 110. The client 111 may be any one of a military simulation program, an escape shooting game, a virtual reality (VR) application program, an augmented reality (AR) program, a three-dimensional map program, a VR game, an AR game, a first-person shooting (FPS) game, a third-person shooting (TPS) game, a MOBA game, or a simulation game (SLG). In this embodiment, an example in which the client 111 is a MOBA game is used for description. The first terminal 110 is a terminal used by a first user 112. The first user 112 uses the first terminal 110 to control a first virtual character located in the virtual environment to perform activities, and the first virtual character may be referred to as a master virtual character of the first user 112. The activities of the first virtual character include, but are not limited to: at least one of moving, jumping, teleporting, casting a skill, adjusting body postures, crawling, walking, running, riding, flying, driving, picking, shooting, attacking, or throwing. For example, the first virtual character is a first virtual character role, for example, a simulated human character or a cartoon human character.

A client 131 supporting a virtual environment is installed and run on the second terminal 130, and the client 131 may be a multiplayer online battle program. When the second terminal 130 runs the client 131, a UI of the client 131 is displayed on a screen of the second terminal 130. The client may be any one of a military simulation program, an escape shooting game, a VR application program, an AR program, a three-dimensional map program, a VR game, an AR game, an FPS game, a TPS game, a MOBA game, or an SLG. In this embodiment, an example in which a client is a MOBA game is used for description. The second terminal 130 is a terminal used by a second user 113. The second user 113 uses the second terminal 130 to control a second virtual character located in the virtual environment to perform activities, and the second virtual character may be referred to as a master virtual character of the second user 113. For example, the second virtual character is a second virtual person character, for example, a simulated person character or a cartoon person character.

In some embodiments, the first virtual character and the second virtual character are located in a same virtual environment. In some embodiments, the first virtual character and the second virtual character may belong to the same camp, the same team, or the same organization, have a friend relationship, or have a temporary communication permission. In some embodiments, the first virtual character and the second virtual character may belong to different camps, different teams, or different organizations, or have an adversarial relationship with each other.

In some embodiments, the client installed on the first terminal 110 is the same as the client installed on the second terminal 130, or the clients installed on the two terminals are the same type of clients of different operating system platforms (Android system or iOS system). The first terminal 110 may generally refer to one of a plurality of terminals, and the second terminal 130 may generally refer to another one of a plurality of terminals. In this embodiment, only the first terminal 110 and the second terminal 130 are used as an example for description. The first terminal 110 and the second terminal 130 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop computer, or a desktop computer.

FIG. 1 shows only two terminals. However, a plurality of other terminals 140 may access the server 120 in different embodiments. In some embodiments, one or more terminals 140 are terminals corresponding to a developer. A developing and editing platform for the client supporting a virtual environment is installed on the terminal 140. The developer may edit and update the client on the terminal 140 and transmit an updated client installation package to the server 120 by using a wired or wireless network. The first terminal 110 and the second terminal 130 may download the client installation package from the server 120 to update the client.

The first terminal 110, the second terminal 130, and the another terminal 140 are connected to the server 120 through a wireless network or a wired network.

The server 120 includes at least one of one server, a plurality of servers, a cloud computing platform, or a virtualization center. The server 120 is configured to provide a background service for a client supporting a virtual environment. In some embodiments, the server 120 is responsible for primary computing work, and the terminal is responsible for secondary computing work. Alternatively, the server 120 is responsible for secondary computing work, and the terminal is responsible for primary computing work. Alternatively, the server 120 and the terminal perform collaborative computing by using a distributed computing architecture therebetween.

In a schematic example, the server 120 includes a processor 122, a user account database 123, a battle service module 124, and a user-oriented input/output (I/O) interface 125. The processor 122 is configured to load instructions stored in the server 121, and process data in the user account database 123 and the battle service module 124. The user account database 123 is configured to store data of user accounts used by the first terminal 110, the second terminal 130, and the another terminal 140, for example, avatars of the user accounts, nicknames of the user accounts, battle effectiveness indexes of the user accounts, and service zones of the user accounts. The battle service module 124 is configured to provide a plurality of battle rooms for the users to battle, for example, a 1V1 battle room, a 3V3 battle room, a 5V5 battle room, and the like. The user-oriented I/O interface 125 is configured to establish communication between the first terminal 110 and/or the second terminal 130 by using a wireless network or a wired network for data exchange.

FIG. 2 is a flowchart of a method for controlling a virtual character to cast a skill according to an exemplary embodiment of this application. The method may be performed by a computer device, and for example, may be performed by a terminal in a system shown in FIG. 1 or a client on the terminal. As shown in FIG. 2, the method includes:

Step 202: Display a first virtual character and a skill control, the skill control being configured to cast a ranged skill.

The first virtual character is a virtual character controlled by a user. The client controls, according to a received human-machine interaction operation from a first user, the first virtual character to move in a virtual environment. Exemplarily, the virtual environment is a three-dimensional virtual environment.

A skill is an ability that is used or cast by a first virtual character, that attacks the first virtual character (including another virtual character and the first virtual character), and that produce a debuff or a buff. The skill includes an active skill and a passive skill. The active skill is a skill used or cast by a virtual character active. The passive skill is a skill that is automatically triggered when a passive condition is satisfied. Exemplarily, the skill mentioned in this embodiment is an active skill proactively used or cast by the first virtual character controlled by the user.

Exemplarily, the skill is alternatively divided into a targeted skill and a ranged skill. The targeted skill is a skill that requires specifying a casting direction or a casting target in skill casting process. The ranged skill is a skill that requires specifying a casting range in a skill casting process. The skill mentioned in this embodiment generally refers to a ranged skill. That is, the ranged skill is a skill that is cast by the first virtual character and that has a specific region range as a skill effect-taking range.

Exemplarily, the naming of the ranged skill is classification of the skill in terms of a manner in which the skill is cast. A process of using a skill by a first virtual character includes: a casting process and an effect-taking process. In the casting process, the terminal receives an operation with which the user casts a skill. In the effect-taking process, the terminal controls, based on an operation of the user, the virtual character to use a skill.

The ranged skill is a skill of which a casting range needs to be determined through a user operation (trigger operation) in a skill casting process. In the effect-taking process of the ranged skill, the terminal needs to control, based on a selected casting range, the virtual character to use the skill.

In an optional implementation, the ranged skill is a skill of which a casting range is selected based on a user operation, of which an effect-taking range is determined based on the casting range, and that is cast in the effect-taking range. In an optional implementation, the ranged skill is a skill of which a casting range is selected based on a user operation, of which a hit object is determined based on the casting range, and that is cast to the hit object.

However, the targeted skill is a skill of which a casting direction is selected based on a user operation, of which an effect-taking direction is based on the casting direction, and that is cast toward the effect-taking direction. In an optional implementation, the targeted skill is a skill of which a casting direction is selected based on a user operation, of which a hit object is determined based on the casting direction, and that is cast to the hit object.

Exemplarily, when the ranged skill is cast, a casting range currently selected by the user is displayed in the virtual environment in real time based on a user operation. The casting range has attributes such as a location, a size, and a shape. In the e methods in related art, only a location of a casting range can be changed through a user operation, and a size and a shape of the casting range are fixed. However, in the method provided by this embodiment of this application, at least one of the location, the size, or the shape of the casting range can be changed through a user operation.

In some embodiments, the "ranged skill" may also be referred to as "regional skill", "region skill", "range skill", or "non-targeted skill", and the "ranged skill indicator" may also be referred to as "regional skill indicator", "region skill indicator", "range skill indicator", or "non-targeted skill indicator".

The skill control is a control configured to control a virtual character to cast a skill. A control form of the skill control includes at least one of a button control or a wheel control.

Figure 3:
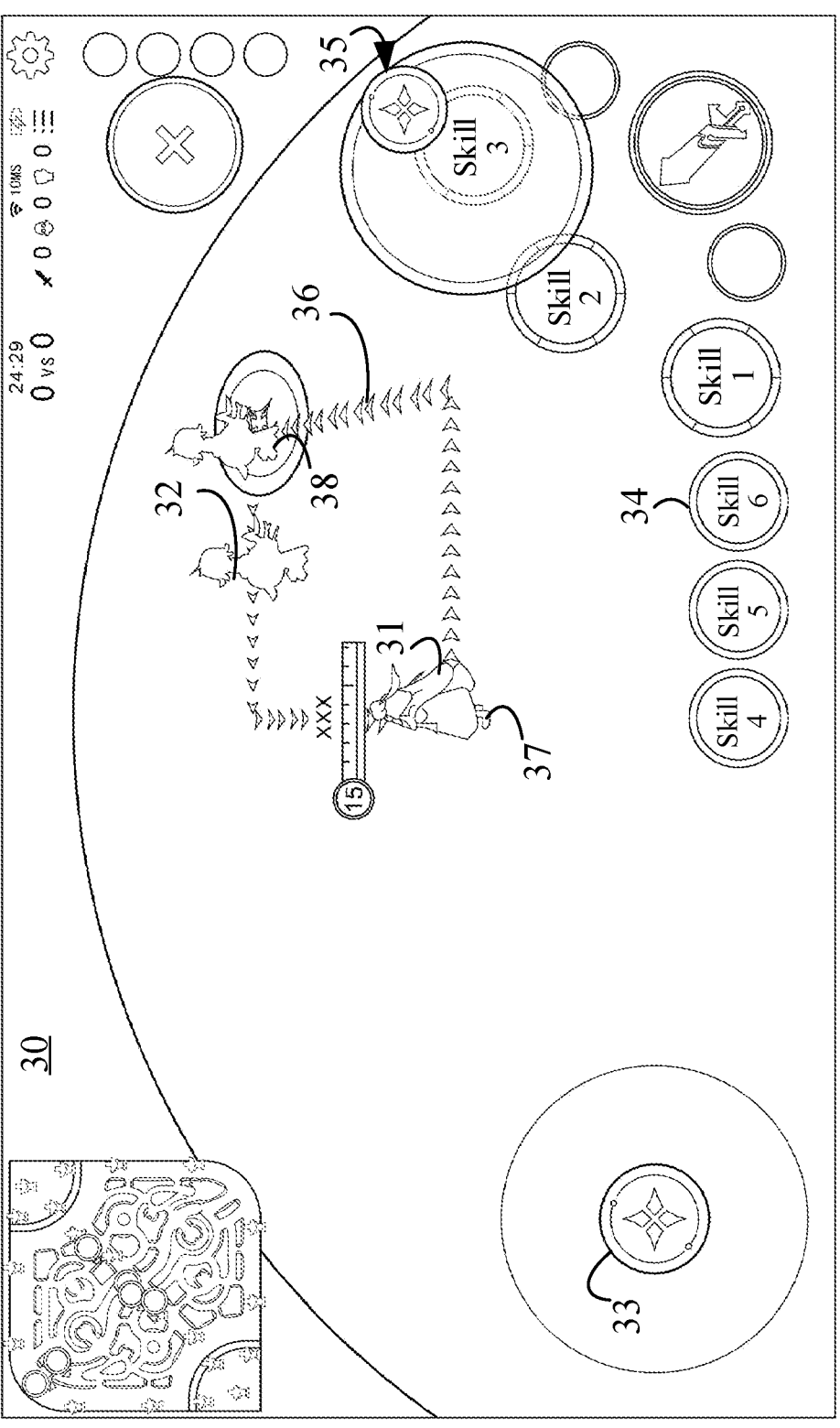
FIG. 3 is a schematic diagram of an interface with a ranged skill indicator being rectangular according to an exemplary embodiment of this application.

Exemplarily, as shown in FIG. 3, the client displays a user interface 30. The user interface 30 includes a virtual environment screen and at least one control.

The virtual environment screen is a screen obtained by observing the three-dimensional virtual environment based on a perspective of a first virtual character 31. For example, a camera model is set in the three-dimensional virtual environment with the perspective of the first virtual character 31, and the three-dimensional virtual environment is photographed using the camera model, to obtain a virtual environment screen. The virtual environment screen includes the first virtual character 31 and a second virtual character 32 located in the virtual environment. In some embodiments, the second virtual character 32 is an enemy virtual character.

At least one control is displayed in a suspended manner on the virtual environment screen in the form of a head-up display (HUD) layer. That is, even if screen content of the virtual environment screen changes, a display location of at least one control is not affected by the screen content. The at least one control includes a mobile wheel 33 on the left and a plurality of skill controls 34 on the right. The mobile wheel 33 is configured to control the movement of the first virtual character 31 in the virtual environment, and the plurality of skill controls 34 are configured to control the first virtual character 31 to cast various skills.

Schematically, the plurality of skill controls 34 include: six skill buttons of a skill 1 to a skill 6, and three normal attack buttons in the lower right corner. In this embodiment, it is assumed that the skill 3 is a skill button of a ranged skill. In a host game scene, a skill control 34 can be implemented using a physical key or a physical joystick.

Step 204: Display a ranged skill indicator in response to a trigger operation on the skill control, the ranged skill indicator being configured to indicate a casting range of the ranged skill based on a user control, the casting range having a first boundary point and a second boundary point, the first boundary point being determined based on a location of the first virtual character, and the second boundary point being determined based on a location of the drag control. In some embodiments, the user control includes a drag control.

The trigger operation is a user operation received by the client and acting on a skill button, and the client generates a trigger instruction according to the received user operation. Exemplarily, the user operation may be at least one of an operation on a UI control, a voice operation, an action operation, a text operation, a mouse operation, a keyboard operation, or a game joystick operation.

The ranged skill indicator is configured to indicate a casting range of the ranged skill. In some embodiments, the ranged skill indicator is configured to indicate a casting range of the ranged skill before the ranged skill is cast and takes effect. The ranged skill indicator is displayed on a reference plane of the virtual environment. The reference plane is a plane used for casting a ranged skill. Using the reference plane being the ground in the virtual environment as an example, the ranged skill indicator is a graphic indicator displayed on the ground of the virtual environment. The graphic indicator occupies a region on the ground of the virtual environment. The region is used for indicating a casting range of the ranged skill.

In this embodiment, the casting range is an enclosed region having a first boundary point and a second boundary point. Generally, the first boundary point and the second boundary point are two most distant points of the enclosed region. Schematically, the closed region is in a shape of any one of a square, a rectangle, a diamond, a circle, an ellipse, a hexagon, or a dodecagon. The first boundary point is determined based on a location of the first virtual character, and the second boundary point is determined based on a location of the drag control.

Using the reference plane being the ground as an example, the first boundary point is determined based on a location of a foothold of the first virtual character on the ground. The drag control is a control that changes as location of the second boundary point by using a drag operation. According to division of display locations, the drag control is displayed on the HUD layer or the reference plane. In accordance with a determination that the drag control is displayed on the HUD layer, the second boundary point is determined based on a mapped location of the drag control on the reference plane. The mapped location is obtained by mapping the display location of the drag control on the HUD layer to the reference plane. In accordance with a determination that the drag control displayed on the reference plane in the virtual environment, the second boundary point is determined based on a real-time location of the drag control on the reference plane.

Schematically, referring to FIG. 3, after the user clicks/ taps the skill button of the skill 3, the drag control 35 and the ranged skill indicator 36 may be additionally displayed on the user interface 30. The ranged skill indicator 36 demarcates a rectangular region based on the first boundary point 37 and the second boundary point 38. The first boundary point 37 is a foothold of the first virtual character 31, and the second boundary point 38 is determined based on the mapped location of the drag control 35 on the virtual ground.

Step 206: Change at least one of a shape or an area of the casting range indicated by the ranged skill indicator in response to a drag operation on the drag control.

The drag operation is an operation of dragging the drag control to move or slide. In accordance with a determination that the drag control is displayed on the HUD layer, the drag operation is an operation of dragging the drag control to move on the HUD layer. In accordance with a determination that the drag control is displayed on the reference plane, the drag operation is an operation of dragging the drag control to move on the reference plane.

A location of the second boundary point on the reference plane is changed in response to a drag operation on the drag control, to further change the shape and/or the area of the casting range indicated by the ranged skill indicator based on constraints of the first boundary point and the second boundary point.

Using the casting range being in a rectangular shape as an example, changing the casting range is changing at least one of a shape and an area of the rectangular shape according to the movement of the second boundary point.

In conclusion, in the method provided in this embodiment, a drag operation on a drag control is received, two boundary points of a casting range are determined respectively based on a location of a first virtual character and a location of the drag control, and further, a shape and/or an area of the casting range are/is changed in response to the drag operation. The area and/or the shape of the casting range bounded by a ranged skill indicator can be changed by receiving only one operation. Therefore, a manner of casting a ranged skill with a customized casting range is provided, to simplify processing steps of a terminal in attacking a plurality of enemy virtual characters at scattered locations, thereby improving the processing efficiency of the terminal.

In the embodiments of this application, the shape of the ranged skill indicator is not limited, provided that the shape can be determined using the first reference point and the second reference point. Schematically, the shape of the ranged skill indicator is any one of a square, a rectangle, a diamond, a circle, an ellipse, a hexagon, or a dodecagon. The first boundary point is determined based on a location of the first virtual character, and the second boundary point is determined based on a location of the drag control.

In some embodiments, the ranged skill indicator 36 is a rectangular region, as shown in FIG. 3. Schematically, the first boundary point 37 is positioned to a foothold of the first virtual character 31, and the second boundary point 38 is positioned to the mapped location of the drag control 35 on the ground. A rectangle, that is, a rectangular ranged skill indicator, is made by using the first boundary point 37 and the second boundary point 38 as two vertices on the diagonal of the rectangular region.

Figure 4:
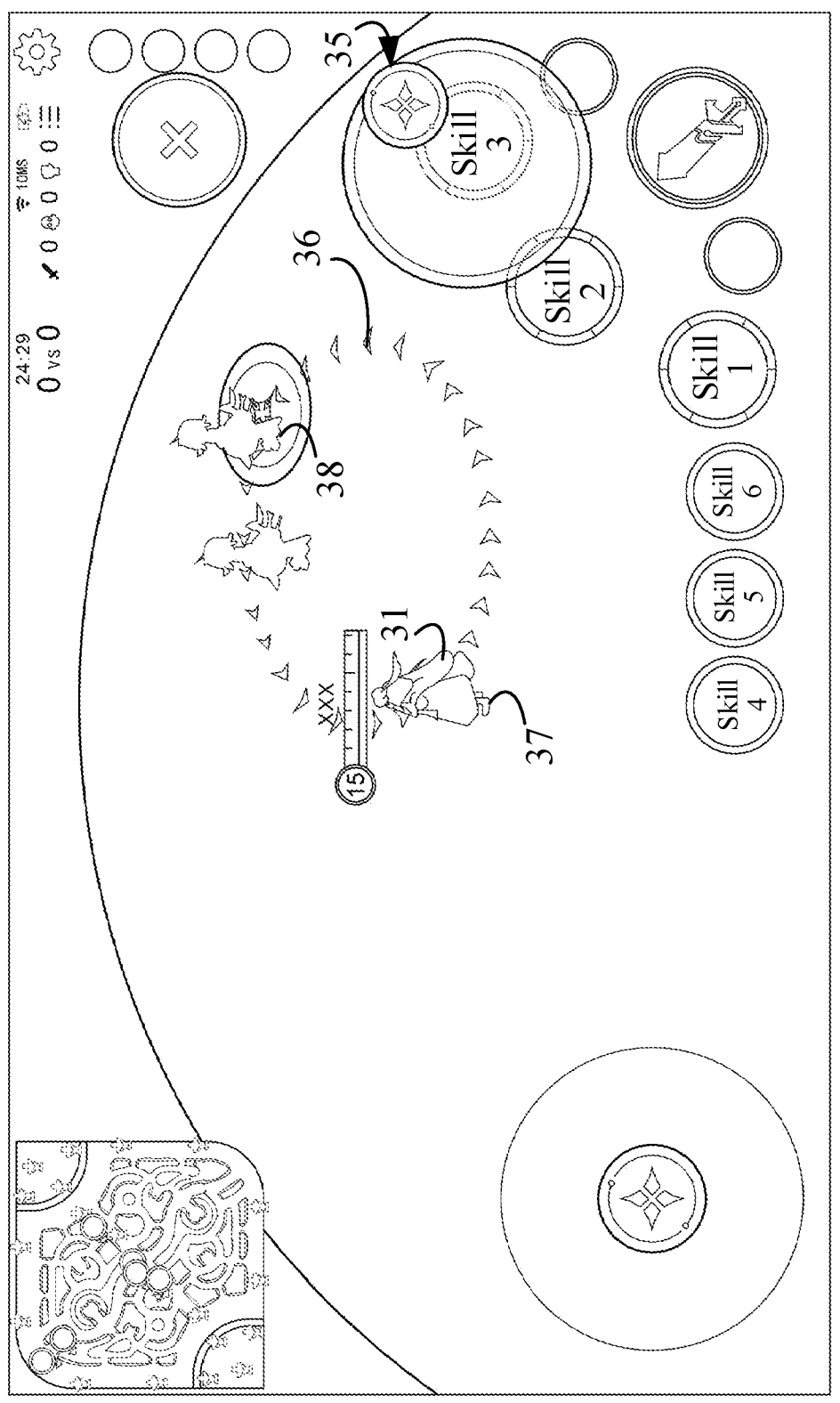
FIG. 4 is a schematic diagram of an interface with a ranged skill indicator being circular according to an exemplary embodiment of this application.

In some embodiments, the ranged skill indicator 36 is circular, as shown in FIG. 4. Schematically, the first boundary point 37 is positioned to a foothold of the first virtual character 31, and the second boundary point 38 is positioned to the mapped location of the drag control 35 on the ground. A circle, that is, a circular ranged skill indicator, is made by using a distance between the first boundary point 37 and the second boundary point 38 as a diameter of the circular ranged skill indicator and using a position that is equidistant between the two as a center of circle.

Figure 5:
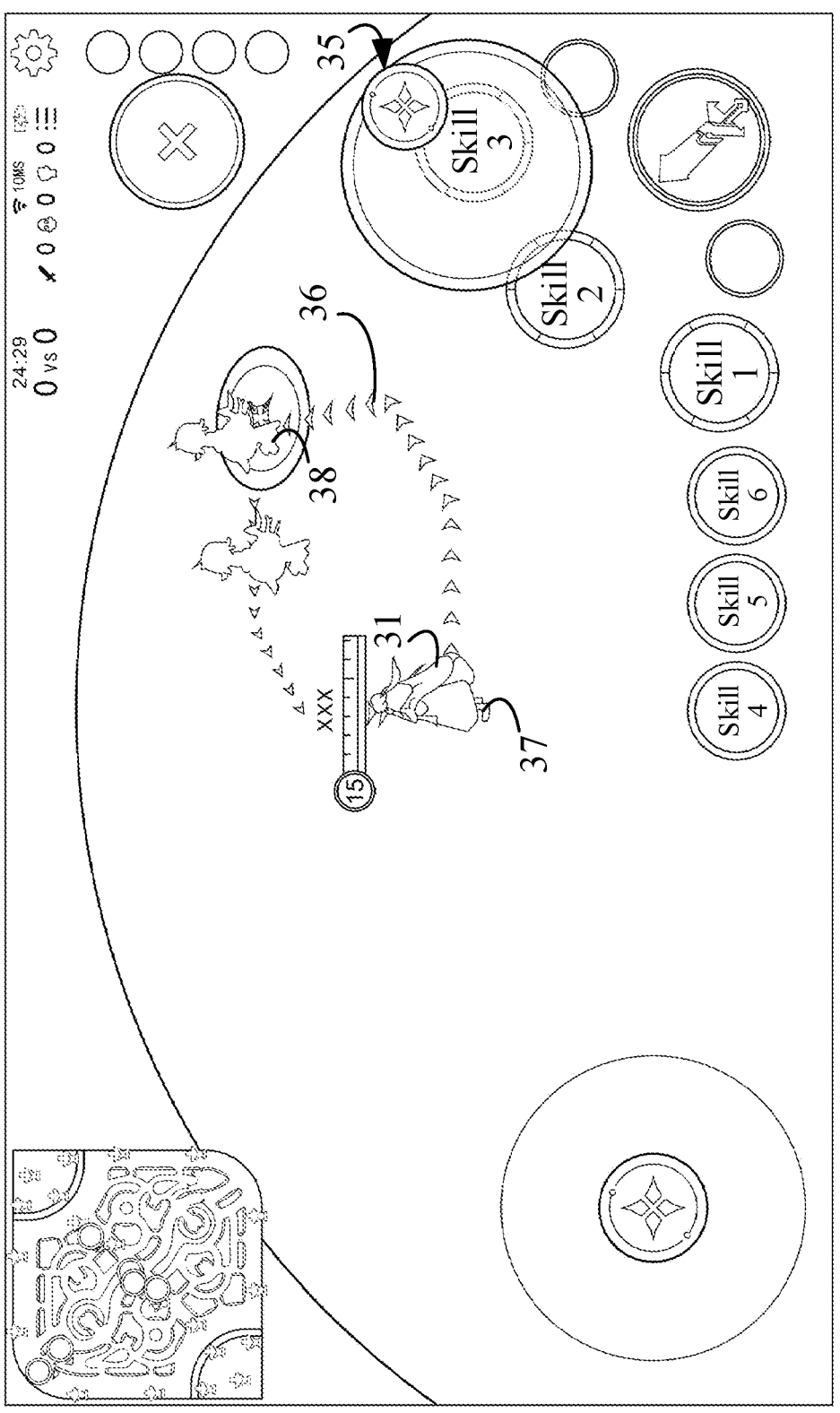
FIG. 5 is a schematic diagram of an interface with a ranged skill indicator being hexagonal according to an exemplary embodiment of this application.

In some embodiments, the ranged skill indicator 36 is in a hexagonal shape, as shown in FIG. 5. Schematically, the first boundary point 37 is positioned to a foothold of the first virtual character 31, and the second boundary point 38 is positioned to the mapped location of the drag control 35 on the ground. A hexagon, that is, a hexagonal ranged skill indicator, is made by using the first boundary point 37 and the second boundary point 38 as two vertices on the diagonal of the hexagonal region.

According to division of display locations, the drag control 35 may be implemented in at least two manners:

First: The drag control 35 is displayed on the HUD layer, described in the embodiment as shown in FIG. 6.

Second: The drag control 35 is displayed on the reference plane of the virtual environment, described in the embodiment as shown in FIG. 10.

For the first manner:

FIG. 6 is a flowchart of a method for controlling a virtual character to cast a skill according to an exemplary embodiment of this application. The method may be performed by a computer device, and for example, may be performed by a terminal shown in FIG. 1 or a client on the terminal. As shown in FIG. 6, the method includes the following steps:

Step 202: Display a first virtual character and a skill control, the skill control being configured to cast a ranged skill.

Reference may be made to step 202 shown in FIG. 2, and details are not described again.

Step 204a: Display a ranged skill indicator on a reference plane of a virtual environment in response to a trigger operation on the skill control; and switch the skill control into a wheel control, the wheel control including a wheel region and a joystick portion, and the ranged skill indicator being configured to indicate a casting range of the ranged skill, the casting range having a first boundary point and a second boundary point, the first boundary point being determined based on a location of the first virtual character, and the second boundary point being determined based on a location of the drag control.

Schematically, the trigger operation is an operation of clicking/tapping the skill control. In an initial state, the skill control is displayed in the form of a skill button.

After the user clicks/taps the skill control, the ranged skill indicator is displayed on the reference plane of the virtual environment. In this embodiment, descriptions are provided by using the ranged skill indicator being a rectangular region skill indicator as an example. In addition, after the user clicks/taps the skill control, the skill control is further switched from being displayed in the form of a skill button to being displayed as a wheel control. In a display process of the wheel control, displaying of the original skill button is canceled or is still retained at the original location.

Figure 7:
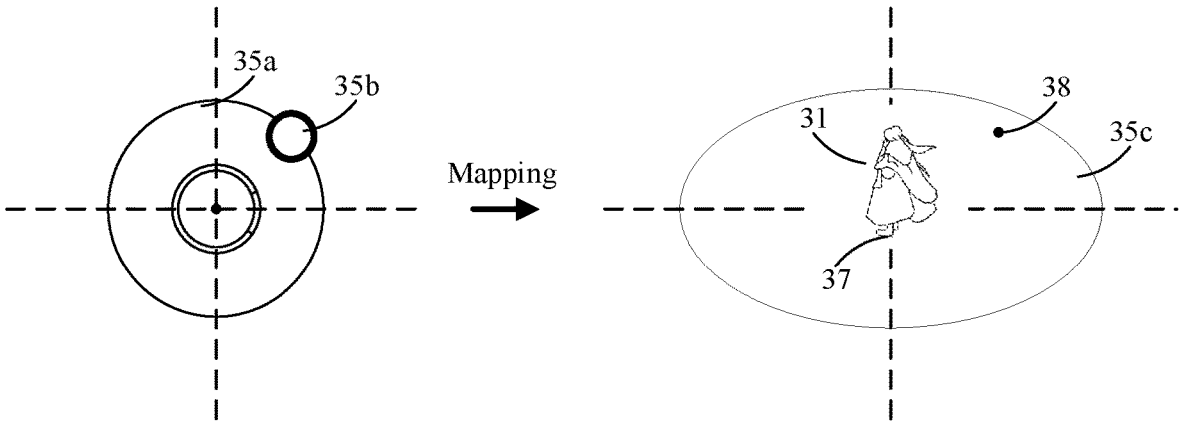
FIG. 7 is a schematic diagram of a wheel control according to an exemplary embodiment of this application.

Schematically, referring to FIG. 7, the wheel control includes a wheel region 35a and a joystick portion 35b. Both the wheel region 35a and the joystick portion 35b are circular, and a display area of the joystick portion 35b is less than a display area of the wheel region 35a. The joystick portion 35b can be dragged to move within a circular range indicated by the wheel region 35a. A center of circle of the wheel region 35a corresponds to the foothold 37 of the first virtual character 31 on the ground of the virtual environment, that is, corresponds to the first boundary point 37. The wheel region 35a corresponds to a circular range 35c on the ground of the virtual environment, and a radius of the wheel region 35a and a radius of the circular range 35c form a mapping ratio k. When the joystick portion 35b moves in the wheel region 35a, the second boundary point 38 is mapped on the ground of the virtual environment at the mapping ratio k according to a directional angle and a distance of the joystick portion 35b relative to the circle of the wheel region 35a.

Figure 8:
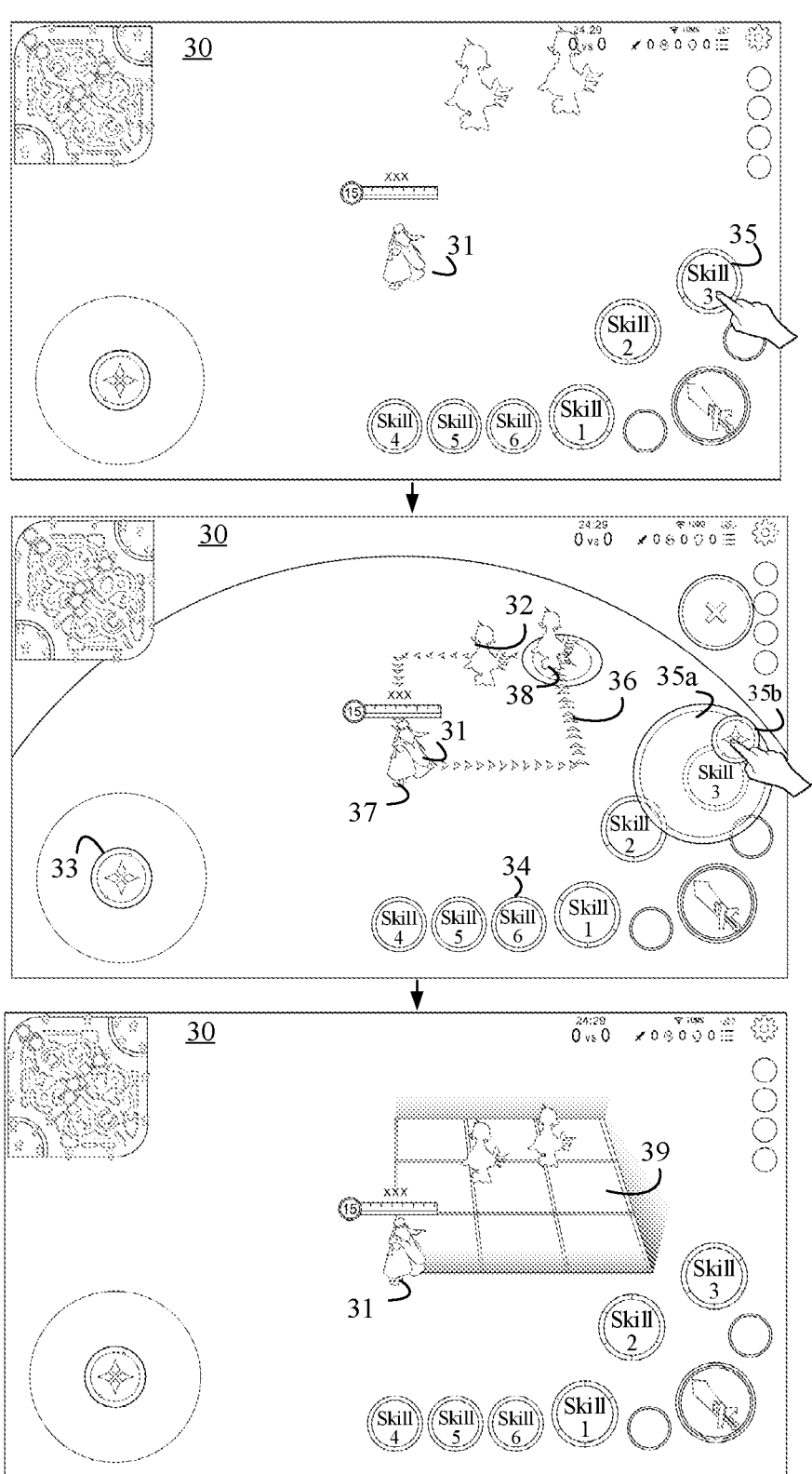
FIG. 8 is a schematic diagram of an interface of a skill effect-taking range according to an exemplary embodiment of this application.

Schematically, referring to FIG. 8, in the initial state, the skill control 35 is displayed in the form of a skill button. After the user clicks/taps the skill control 35, the wheel control and the ranged skill indicator 36 are displayed on the reference plane of the virtual environment. The wheel control includes a wheel region 35a and a joystick portion 35b. In this embodiment, descriptions are provided by using the ranged skill indicator 36 being a rectangular region skill indicator as an example. The ranged skill indicator 36 is determined based on the first boundary point 37 and the second boundary point 38. In a display process of the wheel control, displaying of the original skill button "skill 3" is still retained at the original location.

Step 206a: Update, in response to a drag operation on the joystick portion, the second boundary point based on a mapped location of the joystick portion on the virtual ground, to obtain an updated second boundary point.

After the terminal displays the ranged skill indicator 36, in response to detecting a drag operation on the joystick portion 35b, the second boundary point 38 is determined based on the mapped location of the joystick portion 35b on the virtual ground.

For example, in response to that the terminal detects a leftward sliding operation on the joystick portion 35b, the terminal moves the mapped location of the joystick portion 35b on the virtual ground leftward with the leftward sliding operation, to determine the second boundary point 38, and updates the display location of the second boundary point 38.

In some embodiments, the ranged skill has a plurality of candidate boundary points, and the second boundary point can only be selected from the plurality of candidate boundary points. In response to the drag operation on the joystick portion, the updated second boundary point is determined from the plurality of candidate boundary points based on the mapped location of the joystick portion on the reference plane.

In some embodiments, a manner of determining the second boundary point based on the mapped location may be: determining a candidate boundary point nearest to the mapped location as an updated second boundary point; or determining a candidate boundary point at the upper right of the mapped location and nearest to the mapped location as an updated second boundary point; or determining a candidate boundary point at the lower left of the mapped location and the nearest to the mapped location as an updated second boundary point.

In some embodiments, each candidate boundary point corresponds to a candidate skill effect-taking range. If the drag operation is ended after a corresponding candidate boundary point is selected as the second boundary point, the selected casting range is a skill effect-taking range corresponding to the candidate boundary point. That is, in response to ending the drag operation, the ranged skill within is cast in a current skill effect-taking range, the current skill effect-taking range being equal to a casting range.

Step 206b: Change at least one of a shape or an area of the casting range based on the updated second boundary point.

Because the casting range is determined based on the first boundary point and the second boundary point, in accordance with a determination that the second boundary point is updated, the shape and/or the area of the casting range are/is changed based on the updated second boundary point.

Using the casting range being a rectangular shape as an example, this step includes the following two steps:

S1: Determine an updated rectangular shape by using the first diagonal point and the updated second diagonal point as two diagonal points of the rectangular shape.

S2: Change the casting range indicated by the ranged skill indicator into the updated rectangular shape.

Exemplarily, after the second boundary point mapped on the virtual ground is determined according to a drag/slide operation on the joystick portion of the wheel control, the client determines the updated ranged skill indicator in a rectangular shape according to the first diagonal point and the updated second diagonal point, which are two diagonal points of the rectangular shape. The terminal changes a range of the ranged skill indicator according to the updated rectangle, indicating a casting range of the ranged skill.

Similarly, the first boundary point is determined based on a location of the first virtual character. Therefore, if the user changes the location of the first virtual character using a movement control in a process of casting the ranged skill, an updated first boundary point is determined based on the location of the first virtual character, and a shape and/or an area of the casting range is changed based on the updated first boundary point.

In a possible design, in the process of casting the ranged skill, in response to a movement operation on the movement control, the locations of the first virtual character and the first boundary point are changed simultaneously. The foothold of the first virtual character and the location of the first boundary point are always the same. In another possible design, in the process of casting the ranged skill, in response to a movement operation on the movement control, the foothold of the first virtual character is kept unchanged while changing the location of the first boundary point. In this case, the foothold of the first virtual character and the location of the first boundary point are no longer the same. In another possible design, in the process of casting the ranged skill, in response to a movement operation on the movement control, the location of the first boundary point is kept unchanged while changing the foothold of the first virtual character. In this case, the foothold of the first virtual character and the location of the first boundary point are no longer the same.

Step 208: Determine, in response to ending the drag operation, a current skill effect-taking range of the ranged skill based on the casting range.

The skill effect-taking range is a skill range of the ranged skill after the ranged skill is cast. According to the casting range, the client may automatically adjust the current skill effect-taking range of the ranged skill.

In some embodiments, the casting range is the same as the skill effect-taking range. The terminal directly determines the casting range as the skill effect-taking range.

In some embodiments, the casting range and the skill effect-taking range are not exactly the same and are slightly different from each other. The terminal determines the skill effect-taking range based on the casting range that is used as a reference.

Schematically, the ranged skill includes a plurality of candidate skill effect-taking ranges. Schematically, referring to FIG. 9, a world coordinate system is established by using the ground in the virtual environment as a reference plane and the location of the first virtual character as a center, and a largest skill effect-taking range of the ranged skill is divided into a plurality of square regions in unit of 3 meters, 3 meters being merely an example. In this case, the ranged skill includes 5 candidate square skill effect-taking ranges and a plurality of candidate rectangular skill effect-taking ranges:

First skill effect-taking range: Coordinates of the first boundary point are (0, 0), coordinates of the second boundary point are (3, 3), and the first skill effect-taking range includes blocks A, B, F, and G.

Second skill effect-taking range: Coordinates of the first boundary point are (0, 0), coordinates of the second boundary point are (6, 6), the second skill effect-taking range includes blocks A, B, C, F, G, H, K, L, and M.

Third skill effect-taking range: Coordinates of the first boundary point are (0, 0), coordinates of the second boundary point are (9, 9), the third skill effect-taking range includes blocks A, B, C, F, G, H, K, L, M, and N.

Fourth skill effect-taking range: Coordinates of the first boundary point are (0, 0), and coordinates of the second boundary point are (12, 12).

Fifth skill effect-taking range: Coordinates of the first boundary point are (0, 0), and coordinates of the second boundary point are (15, 15). The fifth skill effect-taking range is the largest skill effect-taking range of the ranged skill.

The plurality of candidate rectangular skill effect-taking ranges include:

a sixth skill effect-taking range, including blocks A and B;
a seventh skill effect-taking range, including blocks A, B, and C;
an eighth skill effect-taking range, including blocks A, B, C, and D;
a ninth skill effect-taking range, including blocks A, B, C, D, and E; and
a tenth skill effect-taking range, including blocks A, B, C, D, F, G, and H.

By analogy, details are not described again one by one, and each rectangular skill effect-taking range includes a plurality of neighboring blocks.

In a possible design, a smallest external skill effect-taking range of the casting range is selected from the plurality of candidate skill effect-taking ranges, and is determined as the current skill effect-taking range of the ranged skill. A "smallest external" skill effect-taking range is one of the plurality of candidate skill effect-taking ranges including or covering the casting range.

Figure 9:
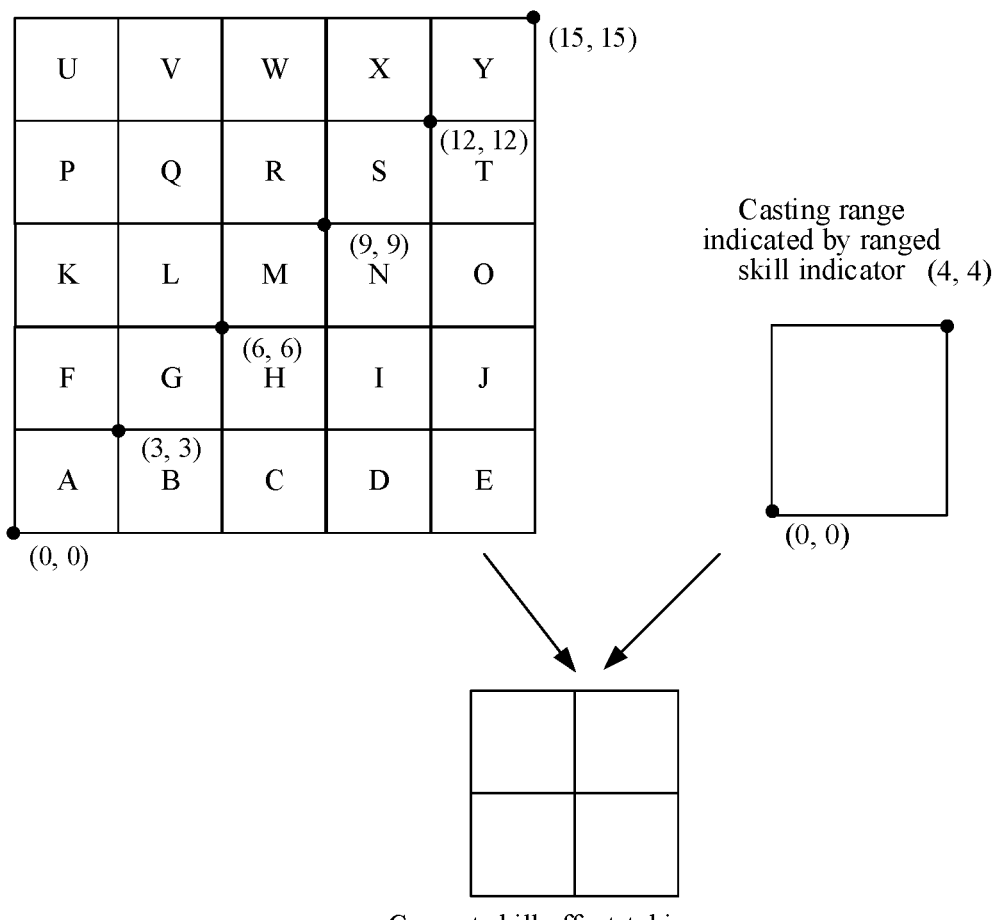
FIG. 9 is a schematic diagram of determining a current skill effect-taking range according to an exemplary embodiment of this application.

Referring to FIG. 9, it is assumed that the coordinates of the second boundary point corresponding to the casting range are (4, 4). Therefore, the coordinates of the second boundary point are rounded up to (6, 6), and the second skill effect-taking range is determined as the current skill effect-taking range of the ranged skill. In another example, it is assumed that the coordinates of the second boundary point corresponding to the casting range are (2, 4). Therefore, the coordinates of the second boundary point are rounded up to (3, 6), and the block A and block F are determined as the current skill effect-taking range of the ranged skill.

In another possible design, the skill effect-taking range having the highest overlapping area ratio with the casting range is selected from a plurality of candidate skill effect-taking ranges, and is determined as the current skill effect-taking range of the ranged skill.

Referring to FIG. 9, it is assumed that the coordinates of the second boundary point corresponding to the casting range are (4, 4), the overlapping area ratio between the first skill effect-taking range and the casting range is 9/16=56%, and the overlapping area ratio between the second skill effect-taking range and the casting range is 16/36=44%. Therefore, the first skill effect-taking range is determined as the current skill effect-taking range of the ranged skill.

Step 210: Cast the ranged skill in the current skill effect-taking range.

After the ranged skill is cast, the ranged skill may generate a skill effect-taking value for the second virtual character 32 within the current skill effect-taking range. The skill effect-taking value may be a hit point damage value, a hit point recovery value, a mana damage value, a mana recovery value, or the like.

Exemplarily, an effect-taking value of the ranged skill within the current skill effect-taking range is determined according to an effect-taking area ratio. The effect-taking area ratio is a ratio between an area of the current skill effect-taking range and an area of a largest skill effect-taking range of the ranged skill. The largest effect-taking area of the ranged skill refers an area of a largest range in which the ranged skill can effectively produce an effect in accordance with a determination that the casting range generated under the drag operation of the user is on a boundary of the wheel region, for example, the fifth skill effect-taking range in FIG. 9.

In a possible design, a unit area effect-taking value of the ranged skill is determined according to the effect-taking area ratio. The unit area effect-taking value refers to a skill effect-taking value in a unit area.

Exemplarily, in accordance with a determination that a total effect-taking value of the ranged skill remains unchanged, the smaller the effect-taking area ratio, the larger the unit area effect-taking value; and the larger the effect-taking area ratio, the smaller the unit area effect-taking value. In this way, in accordance with a determination that there are fewer enemy virtual characters, more damage can be caused.

In a possible design, a total effect-taking value of the ranged skill is determined according to the effect-taking area ratio. The total area effect-taking value refers to an effect-taking value generated on a total area of the current skill effect-taking range.

Exemplarily, in accordance with a determination that a unit area effect-taking value of the ranged skill remains unchanged, the smaller the effect-taking area ratio, the smaller the total effect-taking value; and the larger the effect-taking area ratio, the larger the total effect-taking value. In this way, in accordance with a determination that the total effect-taking value is small, the mana cost of the first virtual character can be saved.

Using the ranged skill being a skill with a site blocking effect as an example, after the ranged skill is cast according to an operation of a user, a blocking effect is produced in the current skill effect-taking range, so that the enemy virtual character located in the current skill effect-taking range cannot leave the current skill effect-taking range and can only move within the current skill effect-taking range, thereby continuously producing an effect on the enemy virtual character.

Referring to FIG. 8, after the ranged skill is cast, the current skill effect-taking range 39 is displayed on the user interface 30, and an animation effect will be displayed on the current skill effect-taking range 39. To ensure display consistency of the animation effect each time the ranged skill is cast, when creating the animation effect, engineers may create the animation effect according to the largest skill effect-taking range. In accordance with a determination that the current skill effect-taking range 39 is smaller than the largest skill effect-taking range, a mask layer is used to block an animation effect that does not belong to the current skill effect-taking range 39, and only the animation effect belonging to the current skill effect-taking range 39 is retained and displayed. Such a display manner does not require stretching or scaling down the animation effect. Therefore, the display consistency of the animation effect in different skill effect-taking ranges can be ensured.

In conclusion, in the method provided in this embodiment, a drag operation on a drag control is received, two boundary points of a casting range are determined respectively based on a location of a first virtual character and a location of the drag control, and further, a shape and/or an area of the casting range are/is changed in response to the drag operation. The area and/or the shape of the casting range bounded by a ranged skill indicator can be changed by receiving only one operation. Therefore, a manner of casting a ranged skill with a customized casting range is provided, to simplify processing steps of a terminal in attacking a plurality of enemy virtual characters at scattered locations, thereby improving the processing efficiency of the terminal.

In the method provided in this embodiment, a location selected by the joystick portion is further mapped to the reference plane of the virtual environment by receiving a drag operation on the joystick portion of the wheel control, thereby changing the area and/or the shape of the casting range bounded by the ranged skill indicator, and using the joystick portion of the wheel control to control the casting range can simplify the processing steps of the terminal, so that the terminal can efficiently handle the process of aiming at the enemy virtual character.

In the method provided in this embodiment, an effect-taking value of the ranged skill within the current skill effect-taking range can be further determined using an effect-taking area ratio, to determine a casting range of the ranged skill according to a quantity of enemy virtual characters and region ranges in which the enemy virtual characters are distributed, thereby saving the mana cost of the first virtual character while causing more damage to the enemy virtual characters.

For the second manner:

FIG. 10 is a flowchart of a method for controlling a virtual character to cast a skill according to an exemplary embodiment of this application. The method may be performed by a computer device, and for example, may be performed by a terminal shown in FIG. 1 or a client on the terminal. As shown in FIG. 6, the method includes the following steps:

Step 202: Display a first virtual character and a skill control, the skill control being configured to cast a ranged skill.

Reference may be made to step 202 shown in FIG. 2, and details are not described again.

Step 204*b*: Display a ranged skill indicator on a reference plane of a virtual environment in response to a trigger operation on the skill control; and display a drag button at a second boundary point of the ranged skill indicator, the ranged skill indicator being configured to indicate a casting range of the ranged skill, the casting range having a first boundary point and the second boundary point, the first boundary point being determined based on a location of the first virtual character, and the second boundary point being determined based on a location of a drag control.

Exemplarily, the drag control includes a drag button. The user triggers the skill control to evoke the drag button in the virtual environment screen, and may determine a location of the second boundary point by moving the drag button in the virtual environment screen.

Figure 11:
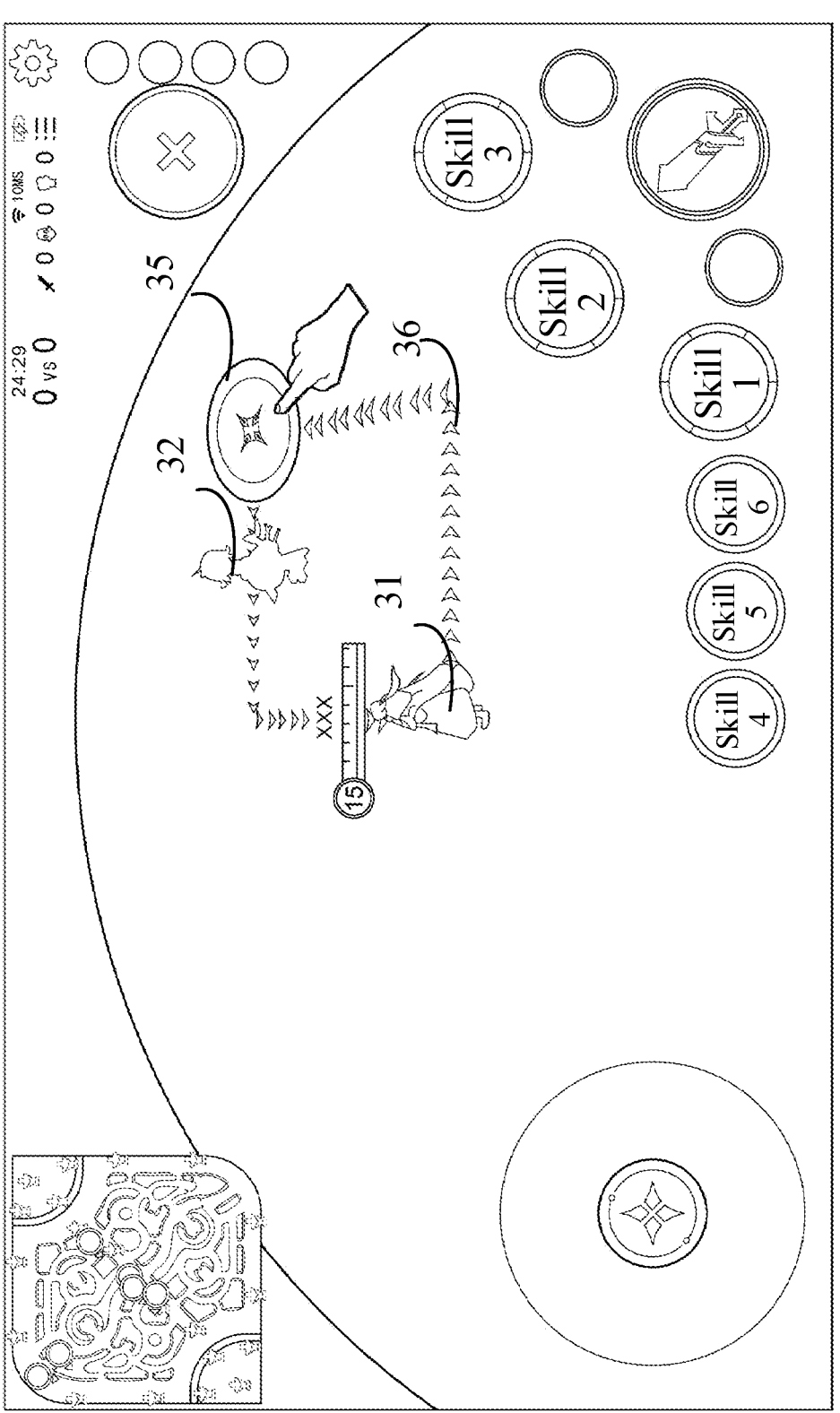
FIG. 11 is a schematic diagram of an interface for controlling a casting range of a virtual character using drag button according to an exemplary embodiment of this application.

Exemplarily, as shown in FIG. 11, when the user clicks/taps the skill control "skill 3", the drag button 35 may be evoked in the virtual environment screen, and the ranged skill indicator 36 and the drag button 35 are displayed on the virtual environment screen of the user interface. The user can move the drag button 35 in the displayed screen of the virtual environment by holding down the drag button 35, and the client determines a final location of the drag button 35 on the reference plane of the virtual environment as the second boundary point. The ranged skill indicator 36 is in a shape of a rectangle displayed on the reference plane with a location of the first virtual character 31 as the first boundary point and a final determined location of the drag button 35 on the reference plane as the second boundary point. Exemplarily, in accordance with a determination that the drag button is evoked, the drag button is hold down and moved arbitrarily, to change the location of the second boundary point to which the drag button corresponds on the reference plane, thereby changing the region range indicated by the ranged skill indicator.

Step 206*c*: Update, in response to a drag operation on the drag button, the second boundary point based on a location of the drag button on the reference plane, to obtain an updated second boundary point.

Exemplarily, after the terminal displays the ranged skill indicator, the terminal detects a drag operation of the drag button on the virtual environment screen, and the client determines the second boundary point according to a location of the drag button on the virtual ground.

For example, in response to that the terminal detects a leftward sliding operation on the joystick portion 35*b*, the terminal moves the mapped location of the joystick portion 35*b* on the virtual ground leftward with the leftward sliding operation, to determine the second boundary point 38, and updates the display location of the second boundary point 38.

In some embodiments, the ranged skill has a plurality of candidate boundary points, and the second boundary point can only be selected from the plurality of candidate boundary points. In response to the drag operation on the drag button, the updated second boundary point is determined from the plurality of candidate boundary points based on the location of the drag button on the reference plane.

Exemplarily, a manner of determining the second boundary point based on the location of the drag button on the reference plane may be: determining a candidate boundary point nearest to the location as an updated second boundary point; or determining a candidate boundary point at the upper right of the mapped location and nearest to the location as an updated second boundary point; or determining a candidate boundary point at the lower left of the mapped location and the nearest to the location as an updated second boundary point.

Exemplarily, each candidate boundary point corresponds to a candidate skill effect-taking range. If the drag operation is ended after a corresponding candidate boundary point is selected as the second boundary point, the selected casting range is a skill effect-taking range corresponding to the candidate boundary point. That is, in response to ending the drag operation, the ranged skill within is cast in a current skill effect-taking range, the current skill effect-taking range being equal to a casting range.

Step 206d: Change at least one of a shape or an area of the casting range based on the updated second boundary point.

Because the casting range is determined based on the first boundary point and the second boundary point, in accordance with a determination that the second boundary point is updated, the shape and/or the area of the casting range are/is changed based on the updated second boundary point.

Similarly, the first boundary point is determined based on a location of the first virtual character. Therefore, if the user changes the location of the first virtual character using a movement control in a process of casting the ranged skill, an updated first boundary point is determined based on the location of the first virtual character, and a shape and/or an area of the casting range is changed based on the updated first boundary point.

Using the casting range being a rectangular shape as an example, this step includes the following two steps:

S1: Determine an updated rectangular shape by using the first diagonal point and the updated second diagonal point as two diagonal points of the rectangular shape.

S2: Change the casting range indicated by the ranged skill indicator into the updated rectangular shape.

Exemplarily, after the second boundary point mapped on the virtual ground is determined according to a drag/slide operation on the joystick portion of the wheel control, the client determines the updated ranged skill indicator in a rectangular shape according to the first diagonal point and the updated second diagonal point, which are two diagonal points of the rectangular shape. The terminal changes a range of the ranged skill indicator according to the updated rectangle, indicating a casting range of the ranged skill.

Step 208: Determine, in response to ending the drag operation, a current skill effect-taking range of the ranged skill based on the casting range.

The skill effect-taking range is a skill range of the ranged skill after the ranged skill is cast. According to the casting range, the client may automatically adjust the current skill effect-taking range of the ranged skill.

In some embodiments, the casting range is the same as the skill effect-taking range. The terminal directly determines the casting range as the skill effect-taking range.

In some embodiments, the casting range and the skill effect-taking range are not exactly the same and are slightly different from each other. The terminal determines the skill effect-taking range based on the casting range that is used as a reference.

Schematically, the ranged skill includes a plurality of candidate skill effect-taking ranges. Schematically, referring to FIG. 9, a world coordinate system is established by using the ground in the virtual environment as a reference plane and the location of the first virtual character as a center, and the reference plane is divided into a plurality of small-area regions in unit of 3 meter. In this case, the ranged skill includes 5 candidate skill effect-taking ranges:

First skill effect-taking range: Coordinates of the first boundary point are (0, 0), and coordinates of the second boundary point are (3, 3).

Second skill effect-taking range: Coordinates of the first boundary point are (0, 0), and coordinates of the second boundary point are (6, 6).

Third skill effect-taking range: Coordinates of the first boundary point are (0, 0), and coordinates of the second boundary point are (9, 9).

Fourth skill effect-taking range: Coordinates of the first boundary point are (0, 0), and coordinates of the second boundary point are (12, 12).

Fifth skill effect-taking range: Coordinates of the first boundary point are (0, 0), and coordinates of the second boundary point are (15, 15). The fifth skill effect-taking range is the largest skill effect-taking range of the ranged skill.

In a possible design, a smallest external skill effect-taking range of the casting range is selected from the plurality of candidate skill effect-taking ranges, and is determined as the current skill effect-taking range of the ranged skill. A "smallest external" skill effect-taking range is one of the plurality of candidate skill effect-taking ranges including or covering the casting range.

In another possible design, the skill effect-taking range having the highest overlapping area ratio with the casting range is selected from a plurality of candidate skill effect-taking ranges, and is determined as the current skill effect-taking range of the ranged skill.

Step 210: Cast the ranged skill in the current skill effect-taking range.

After the ranged skill is cast, the ranged skill may generate a skill effect-taking value for the second virtual character 32 within the current skill effect-taking range. The skill effect-taking value may be a hit point damage value, a hit point recovery value, a mana damage value, a mana recovery value, or the like.

Exemplarily, an effect-taking value of the ranged skill within the current skill effect-taking range is determined according to an effect-taking area ratio. The effect-taking area ratio is a ratio between an area of the current skill effect-taking range and an area of a largest skill effect-taking range of the ranged skill. The largest effect-taking area of the ranged skill refers an area of a largest range in which the ranged skill can effectively produce an effect in accordance with a determination that the casting range generated under the drag operation of the user is on a boundary of the wheel region, for example, the fifth skill effect-taking range in FIG. 9.

In a possible design, a unit area effect-taking value of the ranged skill is determined according to the effect-taking area ratio. The unit area effect-taking value refers to a skill effect-taking value in a unit area.

Exemplarily, in accordance with a determination that a total effect-taking value of the ranged skill remains unchanged, the smaller the effect-taking area ratio, the larger the unit area effect-taking value; and the larger the effect-taking area ratio, the smaller the unit area effect-taking value. In this way, in accordance with a determination that there are fewer enemy virtual characters, more damage can be caused.

In a possible design, a total effect-taking value of the ranged skill is determined according to the effect-taking area ratio. The total area effect-taking value refers to an effect-taking value generated on a total area of the current skill effect-taking range.

Exemplarily, in accordance with a determination that a unit area effect-taking value of the ranged skill remains unchanged, the smaller the effect-taking area ratio, the smaller the total effect-taking value; and the larger the effect-taking area ratio, the larger the total effect-taking value. In this way, in accordance with a determination that the total effect-taking value is small, the mana cost of the first virtual character can be saved.

Using the ranged skill being a skill with a site blocking effect as an example, after the ranged skill is cast according to an operation of a user, a blocking effect is produced in the current skill effect-taking range, so that the enemy virtual character located in the current skill effect-taking range cannot leave the current skill effect-taking range and can only move within the current skill effect-taking range, thereby continuously producing an effect on the enemy virtual character.

In conclusion, in the method provided in this embodiment, a drag operation on a drag control is received, two boundary points of a casting range are determined respectively based on a location of a first virtual character and a location of the drag control, and further, a shape and/or an area of the casting range are/is changed in response to the drag operation. The area and/or the shape of the casting range bounded by a ranged skill indicator can be changed by receiving only one operation. Therefore, a manner of casting a ranged skill with a customized casting range is provided, to simplify processing steps of a terminal in attacking a plurality of enemy virtual characters at scattered locations, thereby improving the processing efficiency of the terminal.

In the method provided in this embodiment, the drag button located in the virtual environment screen is displayed by receiving a trigger operation on the skill control, a drag operation is received using the drag button in the virtual environment screen, and a location of the second boundary point is determined based on the drag operation, thereby changing an area and/or a shape of a casting range bounded by the ranged skill indicator. The drag button is displayed in the virtual environment screen, to improve the accuracy of the drag operation received by the terminal, so that the terminal can accurately display the release range selected by the operation in the virtual environment screen according to the drag operation.

In the method provided in this embodiment, an effect-taking value of the ranged skill within the current skill effect-taking range can be further determined using an effect-taking area ratio, to determine a casting range of the ranged skill according to a quantity of enemy virtual characters and region ranges in which the enemy virtual characters are distributed, thereby saving the mana cost of the first virtual character while causing more damage to the enemy virtual characters.

After a ranged skill is used, the ranged skill can be used again only after a specific cooldown period is passed. This application also provides optional steps for returning a cooldown duration based on a current skill effect-taking range.

Figure 12:
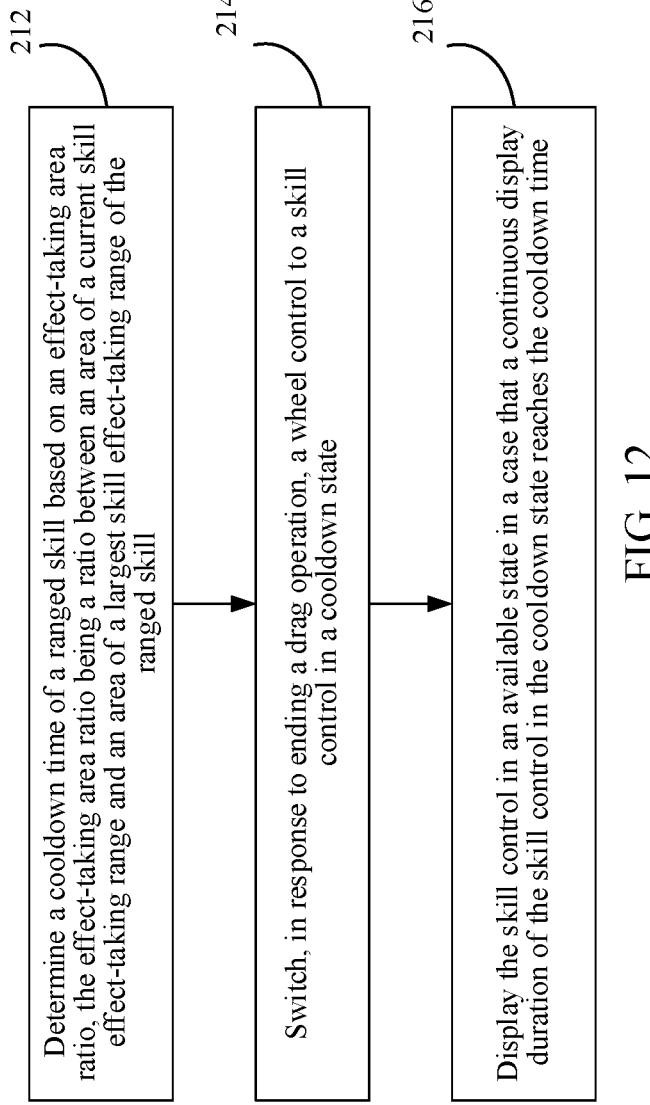
FIG. 12 is a flowchart of a method for controlling a virtual character to cast a skill according to an exemplary embodiment of this application.

FIG. 12 is a flowchart of a method for controlling a virtual character to cast a skill according to an exemplary embodiment of this application. The method may be performed by a computer device, and for example, may be performed by a terminal shown in FIG. 1 or a client on the terminal. Based on the foregoing method embodiment, the method may further include the following steps:

Step 212: Determine a cooldown time of the ranged skill based on an effect-taking area ratio, the effect-taking area ratio being a ratio between an area of the current skill effect-taking range and an area of a largest skill effect-taking range of the ranged skill.

After a ranged skill is cast, the ranged skill is buffered for cooldown. A cooldown time refers to a time during which the ranged skill can no longer be operated and is determined according to an effect-taking area ratio. The effect-taking area ratio is a ratio between an area of the current skill effect-taking range and an area of a largest skill effect-taking range of the ranged skill. The largest effect-taking area of the ranged skill refers an area of a largest range in which the ranged skill can effectively produce an effect in accordance with a determination that the casting range generated under the drag operation of the user is on a boundary of the wheel region, for example, the fifth skill effect-taking range in FIG. 9.

In some embodiments, the effect-taking area ratio is directly proportional relationship to the cooldown time. The larger the effect-taking area ratio, the longer the cooldown time; and the smaller the effect-taking area ratio, the shorter the cooldown time.

In some embodiments, a product of the effect-taking area ratio and the cooldown coefficient is determined as the cooldown time of the ranged skill. In some embodiments, a compensation coefficient may be selected according to linear compensation or according to various compensation manners such as nonlinear compensation and parabolic compensation, which is not limited in this embodiment. In some embodiments if an area of the current skill effect-taking range of the ranged skill accounts for 50% of an area of the largest skill effect-taking range thereof, the client may return 50% of the largest cooldown time for the ranged skill as a cooldown buffer.

Exemplarily, when a selection is made from a plurality of candidate skill effect-taking ranges, selecting a smaller skill effect-taking range may reduce a cooldown time of the ranged skill.

Step 214: Switch, in response to ending the drag operation, the wheel control to the skill control in a cooldown state.

Exemplarily, ending the end drag operation includes at least one of ending dragging the wheel control by the user or ending holding down the drag button by the user.

After the user ends the drag operation, the client may switch the wheel control to the skill control in a cooldown state. In the cooldown stage, the wheel control can no longer be operated, that is, the ranged skill can no longer be cast.

Step 216: Display the skill control in an available state in accordance with a determination that a continuous display duration of the skill control in the cooldown state reaches the cooldown time.

Exemplarily, after a continuous display duration of the skill control in the cooldown state reaches the cooldown time, the skill control will be restored to an available state. In this case, the ranged skill can be cast again by dragging the skill control.

This embodiment can be combined with any one of the three optional embodiments shown in FIG. 2, FIG. 6 and FIG. 9.

In conclusion, in the method provided in this embodiment, after receiving an action of ending the dragging, the terminal cools down the skill control for a specific duration, and restores the skill control to the available state when the cooldown duration reaches the cooldown time, thereby increasing a quantity of effective uses of the ranged skill by compensating for the cooldown time.

In the method provided in this embodiment, the cooldown time of the ranged skill is further determined based on the effect-taking area ratio, so that a smaller skill effect-taking range can be selected from a plurality of candidate skill effect-taking ranges to reduce the cooldown time of the ranged skill.

Figure 13:
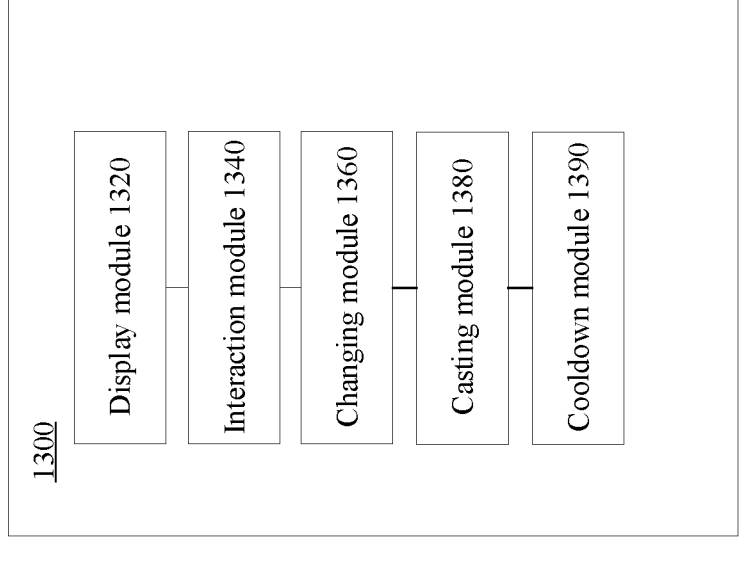
FIG. 13 is a block diagram of an apparatus for controlling a virtual character to cast a skill according to an exemplary embodiment of this application.

FIG. 13 is a schematic structural diagram of an apparatus 1300 for controlling a virtual character to cast a skill according to some embodiments of this application. The apparatus 1300 may be implemented as an entire computer device or a part of the computer device by using software, hardware, or a combination thereof. The apparatus 1300 includes:

a display module 1320, configured to display a first virtual character and a skill control, the skill control being configured to cast a ranged skill;

an interaction module 1340, configured to display a ranged skill indicator and a drag control in response to a trigger operation on the skill control, the ranged skill indicator being configured to indicate a casting range of the ranged skill, the casting range having a first boundary point and a second boundary point, the first boundary point being determined based on a location of the first virtual character, and the second boundary point being determined based on a location of the drag control; and a changing module 1360, configured to change at least one of a shape or an area of the casting range in response to a drag operation on the drag control.

Based on an implementation 1, the drag control includes a wheel control.

The interaction module 1340 is configured to display the ranged skill indicator on a reference plane of a virtual environment in response to the trigger operation on the skill control; and display the skill control as the wheel control, the wheel control including a wheel region and a joystick portion.

The changing module 1360 is configured to change at least one of the shape or the area of the casting range in response to a drag operation on the joystick portion.

In an optional design of this embodiment, the changing module 1360 is configured to update, in response to the drag operation on the joystick portion, the second boundary point based on a mapped location of the joystick portion on the reference plane, to obtain an updated second boundary point; and change at least one of the shape or the area of the casting range based on the updated second boundary point.

Based on an implementation 2: the drag control includes a drag button.

The interaction module 1340 is configured to display the ranged skill indicator on a reference plane of a virtual environment in response to the trigger operation on the skill control; and display the drag button at the second boundary point of the ranged skill indicator.

The changing module 1360 is configured to change at least one of the shape or the area of the casting range in response to a drag operation on the drag button.

In an optional design of this embodiment, the changing module 1360 is configured to update, in response to the drag operation on the drag button, the second boundary point based on a location of the drag button on the reference plane, to obtain an updated second boundary point; and change at least one of the shape or the area of the casting range based on the updated second boundary point.

In an optional design of this embodiment, the ranged skill indicator is a skill indicator in a rectangular shape, the first boundary point is a first diagonal point of the rectangular shape, and the second boundary point is a second diagonal point of the rectangular shape.

The changing module 1360 is configured to determine an updated rectangular shape by using the first diagonal point and the updated second diagonal point as two diagonal points of the rectangular shape; change the casting range indicated by the ranged skill indicator into the updated rectangular shape.

In an optional design of this embodiment, the apparatus further includes:

a casting module 1380, configured to determine, in response to ending the drag operation, a current skill effect-taking range of the ranged skill based on the casting range; and cast the ranged skill in the current skill effect-taking range.

In an optional design of this embodiment, the ranged skill includes a plurality of candidate skill effect-taking ranges.

The casting module 1380 is configured to select, in response to ending the drag operation, a skill effect-taking range having the highest overlapping area ratio with the casting range from the plurality of candidate skill effect-taking ranges, and determining the skill effect-taking range as the current skill effect-taking range of the ranged skill.

Alternatively, the casting module 1380 is configured to select, in response to ending the drag operation, a smallest external skill effect-taking range of the casting range from the plurality of candidate skill effect-taking ranges, and to determine the skill effect-taking range as the current skill effect-taking range of the ranged skill.

In some embodiments, the casting module 1380 is configured to determine a unit area effect-taking value of the ranged skill based on an effect-taking area ratio, the effect-taking area ratio being a ratio between an area of the current skill effect-taking range and an area of a largest skill effect-taking range of the ranged skill; and cast the ranged skill corresponding to the unit area effect-taking value in the current skill effect-taking range.

Alternatively, the casting module 1380 is configured to determine a total effect-taking value of the ranged skill based on an effect-taking area ratio, the effect-taking area ratio being a ratio between an area of the current skill effect-taking range and an area of a largest skill effect-taking range of the ranged skill; and cast the ranged skill corresponding to the total effect-taking value in the current skill effect-taking range.

In an optional design of this embodiment, the ranged skill includes a plurality of candidate boundary points.

The changing module 1360 is configured to determine, in response to the drag operation on the joystick portion, the updated second boundary point from the plurality of candidate boundary points based on the mapped location of the joystick portion on the reference plane.

In some embodiments, the ranged skill includes a plurality of candidate boundary points.

The changing module 1360 is configured to determine, in response to the drag operation on the drag button, the updated second boundary point from the plurality of candidate boundary points based on the location of the drag button on the reference plane.

In an optional design of this embodiment, the casting module 1380 is configured to cast the ranged skill in the current skill effect-taking range in response to ending the drag operation, the current skill effect-taking range being equal to the casting range.

In an optional design of this embodiment, the apparatus further includes:

a cooldown module 1390, configured to determine a cooldown time of the ranged skill based on an effect-taking area ratio, the effect-taking area ratio being a ratio between an area of the current skill effect-taking range and an area of a largest skill effect-taking range of the ranged skill.

The display module 1320 is further configured to switch, in response to ending the drag operation, the wheel control to the skill control in a cooldown state; and display the skill control in an available state in accordance with a determination that a continuous display duration of the skill control in the cooldown state reaches the cooldown time.

Figure 14:
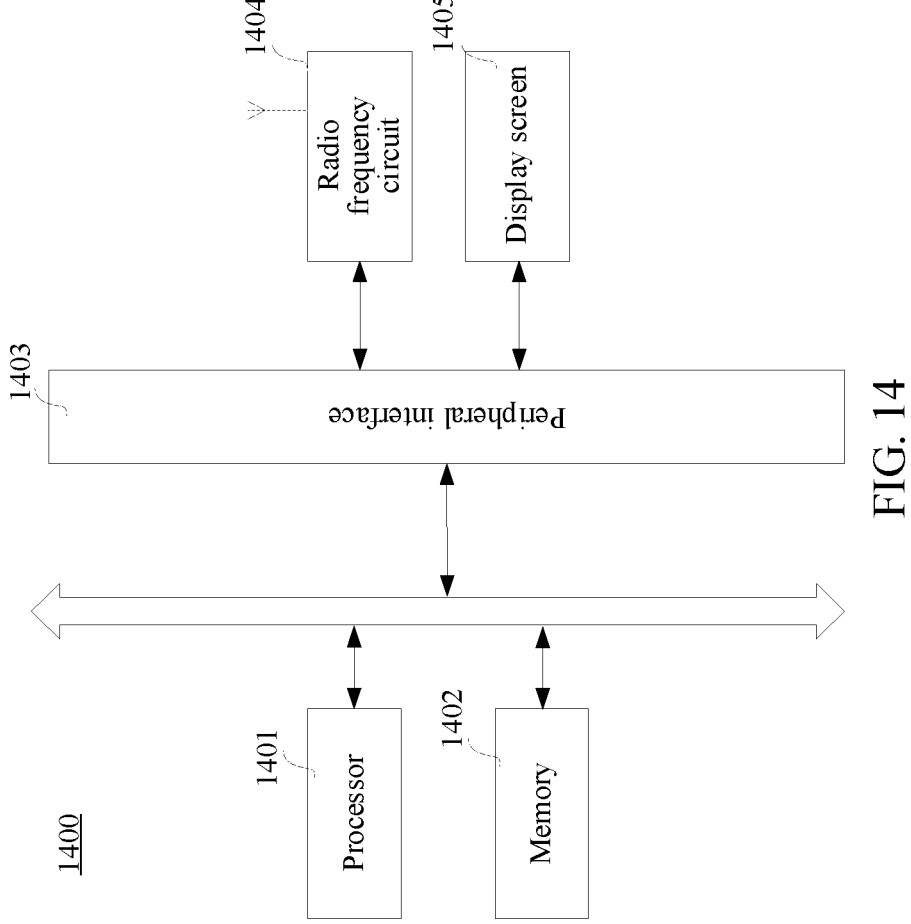
FIG. 14 is a schematic diagram of an apparatus structure of a computer device according to an exemplary embodiment of this application.

FIG. 14 is a structural block diagram of a computer device 1400 according to an exemplary embodiment of this application. The computer device 1400 may be a portable mobile terminal, for example, a smartphone, a tablet computer, an MP3 player, or an MP4 player. The computer device 1400 may be further referred to as other names such as user equipment and a portable terminal.

Generally, the computer device 1400 includes a processor 1401 and a memory 1402.

The processor 1401 may include one or more processing cores, for example, a 4-core processor or an 8-core processor. The processor 1401 may be implemented by using at least one hardware form of a digital signal processor (DSP), a field programmable gate array (FPGA), and a programmable logic array (PLA). The processor 1401 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process computing operations related to machine learning.

The memory 1402 may include one or more computer-readable storage media. The computer-readable storage medium may be tangible and non-transient. The memory 1402 may further include a high-speed random access memory and a nonvolatile memory, for example, one or more disk storage devices or flash storage devices. In some embodiments, a non-transitory computer-readable storage medium in the memory 1402 is configured to store at least one instruction, the at least one instruction being executed by the processor 1401 to implement the method for controlling a virtual character when casting a skill described in this application.

In some embodiments, the computer device 1400 further in some embodiments includes a peripheral device interface 1403 and at least one peripheral. Specifically, the peripheral includes at least one of a radio frequency circuit 1404 or a display screen 1405.

The peripheral interface 1403 may be configured to connect the at least one peripheral related to input/output (I/O) to the processor 1401 and the memory 1402. In some embodiments, the processor 1401, the memory 1402 and the peripheral device interface 1403 are integrated on a same chip or circuit board. In some other embodiments, any one or two of the processor 1401, the memory 1402, and the peripheral device interface 1403 may be implemented on a single chip or circuit board. This is not limited in this embodiment.

The RF circuit 1404 is configured to receive and transmit an RF signal, also referred to as an electromagnetic signal. The RF circuit 1404 communicates with a communication network and other communication devices through the electromagnetic signal. The RF circuit 1404 converts an electric signal into an electromagnetic signal for transmission, or converts a received electromagnetic signal into an electric signal. In some embodiments, the RF circuit 1404 includes: an antenna system, an RF transceiver, one or more amplifiers, a tuner, an oscillator, a digital signal processor, a codec chip set, a subscriber identity module card, and the like. The RF circuit 1404 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF 1404 may further include a circuit related to NFC, which is not limited in this application.

The display screen 1405 is configured to display a user interface (UI). The UI may include a graph, text, an icon, a video, and any combination thereof. The display screen 1405 also has a capability of acquiring a touch signal on or above a surface of the display screen 1405. The touch signal may be inputted to the processor 1401 as a control signal for processing. The display screen 1405 is configured to provide a virtual button and/or a virtual keyboard, which is also referred to as a soft button and/or a soft keyboard. In some embodiments, there may be one display screen 1405, disposed on a front panel of the computer device 1400. In some other embodiments, there may be at least two display screens 1405, disposed on different surfaces of the computer device 1400 respectively or in a folded design. In still other embodiments, the display screen 1405 may be a flexible display screen, disposed on a curved surface or a folded surface of the computer device 1400. Even, the display screen 1405 may be further set in a non-rectangular irregular pattern, namely, a special-shaped screen. The touch display screen 1405 may be made of a material such as a liquid crystal display (LCD) or an organic light-emitting diode (OLED).

A person skilled in the art may understand that the structure shown in FIG. 14 does not constitute any limitation on the computer device 1400, and the computer device may include more components or fewer components than those shown in the figure, or some components may be combined, or a different component deployment may be used.

The embodiments of this application further provide a computer device including a processor and a memory, the memory storing at least one instruction, at least one segment of program, a code set, or an instruction set, the at least one instruction, the at least one segment of program, the code set, or the instruction set being loaded and executed by the processor to implement the method for controlling a virtual character to cast a skill provided in the foregoing method embodiments.

The embodiments of this application further provide a computer-readable storage medium, storing at least one instruction, at least one program, a code set, or an instruction set, the at least one instruction, the at least one program, the code set, or the instruction set being loaded and executed by a processor to implement the method for controlling a virtual character to cast a skill provided in the foregoing method embodiments.

"Plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for controlling a virtual character to cast a skill, at an electronic device, the method comprising:

displaying a first virtual character and a skill control configured to cast a ranged skill;

in response to detecting a trigger operation on the skill control:

displaying a ranged skill indicator, wherein the ranged skill indicator is configured to indicate a first boundary point and a second boundary point of a casting range of the ranged skill based on a user control, wherein the first boundary point is determined based on a location of the first virtual character, and the second boundary point is determined based on a location of the user control; and in response to a drag operation on the user control:

changing at least one of a shape or an area of the casting range.

2. The method according to claim 1, wherein the user control comprises a drag control and the drag control comprises a wheel control;

and displaying the ranged skill indicator and the drag control comprises:

displaying the ranged skill indicator on a reference plane of a virtual environment in response to detecting the trigger operation on the skill control; and displaying the skill control as the wheel control, the wheel control comprising a wheel region and a joystick portion; and changing at least one of the shape or the area of the casting range comprises:

changing at least one of the shape or the area of the casting range in response to a drag operation on the joystick portion.

3. The method according to claim 2, wherein changing at least one of a shape or an area of the casting range comprises:

updating, in response to the drag operation on the joystick portion, the second boundary point based on a mapped location of the joystick portion on the reference plane to obtain an updated second boundary point; and changing at least one of the shape or the area of the casting range based on the updated second boundary point.

4. The method according to claim 3, wherein the ranged skill comprises a plurality of candidate boundary points; and updating the second boundary point based on a mapped location of the joystick portion on the reference plane comprises:

determining, in response to the drag operation on the joystick portion, the updated second boundary point from the plurality of candidate boundary points based on the mapped location of the joystick portion on the reference plane.

5. The method according to claim 2, further comprising:

determining a cooldown time of the ranged skill based on an effect-taking area ratio, wherein the effect-taking area ratio is a ratio between an area of the current skill effect-taking range and an area of a largest skill effect-taking range of the ranged skill; and switching, in response to an end of the drag operation, the wheel control to the skill control in a cooldown state; and in accordance with a determination that a continuous display duration of the skill control in the cooldown state reaches the cooldown time:

displaying the skill control in an available state.

6. The method according to claim 1, wherein the user control comprises a drag control, and the drag control comprises a drag button;

displaying the ranged skill indicator and the drag control comprises:

displaying the ranged skill indicator on a reference plane of a virtual environment in response to detecting the trigger operation on the skill control; and displaying the drag button at the second boundary point of the ranged skill indicator; and changing at least one of the shape or the area of the casting range comprises:

changing at least one of the shape or the area of the casting range in response to a drag operation on the drag button.

7. The method according to claim 6, wherein changing at least one of the shape or the area of the casting range comprises:

updating, in response to the drag operation on the drag button, the second boundary point based on a location of the drag button on the reference plane, to obtain an updated second boundary point; and changing at least one of the shape or the area of the casting range based on the updated second boundary point.

8. The method according to claim 7, wherein the ranged skill indicator has a rectangular shape, the first boundary point is a first diagonal point of the rectangular shape, and the second boundary point is a second diagonal point of the rectangular shape; and changing at least one of the shape or the area of the casting range based on the updated second boundary point comprises:

using the first diagonal point and the updated second diagonal point as two diagonal points of the rectangular shape to determine an updated rectangular shape;

changing the casting range indicated by the ranged skill indicator to match the updated rectangular shape.

9. The method according to claim 7, wherein the ranged skill comprises a plurality of candidate boundary points; and updating the second boundary point based on a location of the drag button on the reference plane comprises:

determining, in response to the drag operation on the drag button, the updated second boundary point from the plurality of candidate boundary points based on the location of the drag button on the reference plane.

10. The method according to claim 9, further comprising:
in accordance with detecting an end of the drag operation:
casting the ranged skill in the current skill effect-taking range, wherein the current skill effect-taking range is equal to the casting range.

11. The method according to claim 1, further comprising:
determining, in response to an end of the drag operation, a current skill effect-taking range of the ranged skill based on the casting range; and
casting the ranged skill in the current skill effect-taking range.

12. The method according to claim 11, wherein the ranged skill comprises a plurality of candidate skill effect-taking ranges; and
determining the current skill effect-taking range of the ranged skill comprises:
selecting, in response to the end of the drag operation, a skill effect-taking range from the plurality of candidate skill effect-taking ranges that has a highest overlapping area ratio with the casting range, and setting the skill effect-taking range as the current skill effect-taking range of the ranged skill; or
selecting, in response to the end of the drag operation, a smallest external skill effect-taking range of the casting range from the plurality of candidate skill effect-taking ranges, and setting the skill effect-taking range as the current skill effect-taking range of the ranged skill.

13. The method according to claim 12, wherein casting the ranged skill in the current skill effect-taking range comprises:
determining a unit area effect-taking value of the ranged skill based on an effect-taking area ratio, the effect-taking area ratio being a ratio between an area of the current skill effect-taking range and an area of a largest skill effect-taking range of the ranged skill; and casting the ranged skill corresponding to the unit area effect-taking value in the current skill effect-taking range; or
determining a total effect-taking value of the ranged skill based on an effect-taking area ratio, the effect-taking area ratio being a ratio between an area of the current skill effect-taking range and an area of a largest skill effect-taking range of the ranged skill; and casting the ranged skill corresponding to the total effect-taking value in the current skill effect-taking range.

14. An electronic device, comprising:
one or more processors; and
memory storing one or more programs, the one or more programs comprising instructions that, when executed by the one or more processors, cause the one or more processors to perform operations comprising:
displaying a first virtual character and a skill control configured to cast a ranged skill;
in response to detecting a trigger operation on the skill control:
displaying a ranged skill indicator and a drag control, wherein the ranged skill indicator is configured to indicate a first boundary point and a second boundary point of a casting range of the ranged skill, wherein the first boundary point is determined based on a location of the first virtual character, and the second boundary point is determined based on a location of the drag control; and
in response to a drag operation on the drag control:

changing at least one of a shape or an area of the casting range.

15. The electronic device according to claim 14, wherein the drag control comprises a wheel control;
and displaying the ranged skill indicator and the drag control comprises:
displaying the ranged skill indicator on a reference plane of a virtual environment in response to detecting the trigger operation on the skill control; and displaying the skill control as the wheel control, the wheel control comprising a wheel region and a joystick portion; and
changing at least one of the shape or the area of the casting range comprises:
changing at least one of the shape or the area of the casting range in response to a drag operation on the joystick portion.

16. The electronic device according to claim 15, wherein changing at least one of a shape or an area of the casting range comprises:
updating, in response to the drag operation on the joystick portion, the second boundary point based on a mapped location of the joystick portion on the reference plane to obtain an updated second boundary point; and
changing at least one of the shape or the area of the casting range based on the updated second boundary point.

17. The electronic device according to claim 16, wherein the drag control comprises a drag button;
displaying the ranged skill indicator and the drag control comprises:
displaying the ranged skill indicator on a reference plane of a virtual environment in response to detecting the trigger operation on the skill control; and displaying the drag button at the second boundary point of the ranged skill indicator; and
changing at least one of the shape or the area of the casting range comprises:
changing at least one of the shape or the area of the casting range in response to a drag operation on the drag button.

18. The electronic device according to claim 17, wherein changing at least one of the shape or the area of the casting range comprises:
updating, in response to the drag operation on the drag button, the second boundary point based on a location of the drag button on the reference plane, to obtain an updated second boundary point; and
changing at least one of the shape or the area of the casting range based on the updated second boundary point.

19. The electronic device according to claim 18, wherein the ranged skill indicator has a rectangular shape, the first boundary point is a first diagonal point of the rectangular shape, and the second boundary point is a second diagonal point of the rectangular shape; and
changing at least one of the shape or the area of the casting range based on the updated second boundary point comprises:
using the first diagonal point and the updated second diagonal point as two diagonal points of the rectangular shape to determine an updated rectangular shape;
changing the casting range indicated by the ranged skill indicator to match the updated rectangular shape.

20. A non-transitory computer-readable storage medium, storing a computer program, the computer program, when executed by one or more processors of an electronic device, cause the one or more processors to perform operations comprising:

displaying a first virtual character and a skill control configured to cast a ranged skill;

in response to detecting a trigger operation on the skill control:

displaying a ranged skill indicator, wherein the ranged skill indicator is configured to indicate a first boundary point and a second boundary point of a casting range of the ranged skill, wherein the first boundary point is determined based on a location of the first virtual character, and the second boundary point is determined based on a location of the drag control; and in response to a drag operation on the drag control:

changing at least one of a shape or an area of the casting range.

* * * * *